(12) United States Patent
Skurnik et al.

(10) Patent No.: US 9,229,581 B2
(45) Date of Patent: Jan. 5, 2016

(54) METHOD FOR DETECTING GESTURES USING A MULTI-SEGMENT PHOTODIODE AND ONE OR FEWER ILLUMINATION SOURCES

(75) Inventors: David Skurnik, Kirkland, WA (US); Nevzat Akin Kestelli, San Jose, CA (US); Ilya K. Veygman, Menlo Park, CA (US); Anand Chamakura, San Jose, CA (US); Christopher Francis Edwards, Sunnyvale, CA (US); Nicole Kerness, Menlo Park, CA (US); Pirooz Parvarandeh, Los Altos Hills, CA (US); Sunny Kweisun Hsu, Los Altos, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 913 days.

(21) Appl. No.: 13/352,299

(22) Filed: Jan. 17, 2012

(65) Prior Publication Data

US 2012/0280904 A1    Nov. 8, 2012

Related U.S. Application Data

(63) Continuation-in-part of application No. 13/304,603, filed on Nov. 25, 2011, now Pat. No. 8,716,649.

(60) Provisional application No. 61/483,034, filed on May 5, 2011.

(51) Int. Cl.
*G06F 3/042* (2006.01)
*G06F 3/041* (2006.01)
*G06F 3/01* (2006.01)

(52) U.S. Cl.
CPC .............. *G06F 3/0421* (2013.01); *G06F 3/017* (2013.01); *G06F 3/0416* (2013.01)

(58) Field of Classification Search
CPC ......... G06F 3/017; G06F 3/01; G06F 3/0421; G06F 3/0416; G01C 21/00
USPC .......... 250/216, 231.13, 231.14, 231.16, 239, 250/237 G, 237 R; 356/218, 222, 614–617
See application file for complete search history.

(56) References Cited

U.S. PATENT DOCUMENTS 5,103,085 A    4/1992    Zimmerman
6,288,786 B1   9/2001    Rudd et al.
(Continued)

FOREIGN PATENT DOCUMENTS

EP    1622200 A1    2/2006

OTHER PUBLICATIONS

Office Action dated May 4, 2015 for Australian Appln. No. A 9196/2012.
(Continued)

*Primary Examiner* — Francis M Legasse, Jr.
*Assistant Examiner* — Don Williams
(74) *Attorney, Agent, or Firm* — Advent LLP

(57) ABSTRACT

A gesture sensing device includes a multiple segmented photo sensor and a control circuit for processing sensed voltages output from the sensor. The control circuit processes the sensed voltage signals to determine target motion relative to the segmented photo sensor. The control circuit includes an algorithm configured to calculate one of more differential analog signals using the sensed voltage signals output from the segmented photo sensors. A vector is determined according to the calculated differential analog signals, the vector is used to determine a direction and/or velocity of the target motion.

36 Claims, 14 Drawing Sheets

(56) References Cited

U.S. PATENT DOCUMENTS

| | | |
|---|---|---|
| 6,618,038 B1 | 9/2003 | Bohn |
| 6,724,490 B2 | 4/2004 | Ono |
| 6,838,715 B1 | 1/2005 | Bencuya et al. |
| 7,049,578 B2 * | 5/2006 | Wada et al. ............ 250/231.13 |
| 7,214,920 B2 | 5/2007 | Gazeley |
| 7,683,407 B2 | 3/2010 | Boettiger |
| 7,919,798 B2 | 4/2011 | Lee |
| 8,093,545 B2 | 1/2012 | Leong et al. |
| 8,187,097 B1 | 5/2012 | Zhang |
| 2007/0146318 A1 | 6/2007 | Juh |
| 2008/0006762 A1 | 1/2008 | Fadell |
| 2010/0102230 A1 | 4/2010 | Chang |
| 2010/0255600 A1 | 10/2010 | Farr |
| 2010/0320552 A1 | 12/2010 | Tseng et al. |
| 2011/0310005 A1 | 12/2011 | Chen et al. |
| 2012/0074301 A1 | 3/2012 | Kroese et al. |
| 2014/0035812 A1 | 2/2014 | Skurnik et al. |
| 2014/0284462 A1 | 9/2014 | Skurnik et al. |

OTHER PUBLICATIONS

Silicon Labs, "Silicon Labs Solutions for Active Infrared Proximity Sensing", Oct. 28, 2009, pp. 1-35.

* cited by examiner

A-B is Left Right

C-D is Up Down

METHOD FOR DETECTING GESTURES USING A MULTI-SEGMENT PHOTODIODE AND ONE OR FEWER ILLUMINATION SOURCES

RELATED APPLICATIONS

This patent application is a continuation in part of U.S. patent application Ser. No. 13/304,603, filed Nov. 25, 2011 and entitled, "Optical Gesture Sensor Using A Single Illumination Source." U.S. patent application Ser. No. 13/304,603 claims priority of U.S. Provisional Application Ser. No. 61/483,034, filed May 5, 2011, and entitled "Optical Gesture Sensor Using A Single Illumination Source", by these same inventors. This application incorporates U.S. Provisional Application Ser. No. 61/483,034 and U.S. patent application Ser. No. 13/304,603 in their entireties by reference.

FIELD OF THE INVENTION

This invention relates to displays for electronic devices. More specifically, this invention relates to a device that senses and determines physical gestures.

BACKGROUND OF THE INVENTION

A gesture sensor is a human interface device that enables the detection of physical movement without the user actually touching the device within which the gesture sensor resides. The detected movements can be subsequently used as input commands for the device. In some applications, the device is programmed to recognize distinct non-contact hand motions, such as left to right, right to left, up to down, down to up, in to out, and out to in hand motions. Gesture sensors have found popular use in handheld devices, such as tablet computing devices and smartphones, and other portable devices, such as laptops. Gesture sensors are also being implemented in video game consoles that detect the motion of a video game player.

Many conventional gesture sensor implementations use three or more illumination sources, such as light emitting diodes (LEDs), and a light sensor, such as a photo detector. The illumination sources are turned on and off, or flashed, in succession in order for the sensor to obtain spatial information from reflection of the flashed light. FIG. 1 illustrates a simplified block diagram of a conventional gesture sensor. A photo sensor 4 is positioned proximate LED 1, LED 2, and LED 3. A control circuit 5 is programmed to successively turn on and off the LEDs 1-3 and analyze the resulting measurements sensed by the photo sensor 4. Data sensed by the photo sensor 4 is stored separately for each LED. For example, the sensed data corresponding to each flash of LED 1 is stored in an LED 1 register, the sensed data corresponding to each flash of LED 2 is stored in an LED 2 register, and the sensed data corresponding to each flash of LED 3 is stored in an LED 3 register. The result is a time domain signal for each LED. FIG. 2 illustrates an exemplary method for detecting a moving target using the gesture sensor of FIG. 1. The motion is detected by observing the relative delay between sensed signals from the same-axis LEDs. For example, to detect left to right or right to left motion, the signals sensed by the LEDs 1 and 2 are compared, as shown in FIG. 2. LED 1 is flashed at a different time than LED 2. The LEDs 1 and 2 are positioned in known locations and are turned on and off in a known sequence. When the light from the LEDs strikes a target moving above the LEDs, light is reflected off the moving target back to the photo sensor 4. The sensed reflected light is converted to a voltage signal which is sent to the control circuit 5. The control circuit 5 includes an algorithm that uses the LED positions, the LED firing sequences, and the received sensed data to determine relative movement of the target. The separation in time between flashes of successive LED's is quite small compared to the velocity of the moving target and is therefore negligible when comparing the time domain signals from one LED to another.

FIG. 2 shows the time domain sensed voltage signals for both the case of left to right motion and right to left motion. The curves labeled "Signal from LED 1" show the sensed voltage resulting from repeated flashes of the LED 1. The low portion of each curve indicates the target is not passing over, or near, the LED 1. In other words, the target is not within the "field of view", or coverage area, of the photo sensor 4 whereby light emitted from the LED 1 can be reflected off the target and onto the photo sensor 4. If the target is not within the field of view of the photo sensor 4 as related to the LED 1, the photo sensor 4 does not sense any reflections of light emitted from LED 1. The high portion of the curve indicates the target is within the field of view related to LED 1, which indicates the target is passing over, or near, the LED 1. The curve labeled "Signal from LED 2" shows the sensed voltage resulting from repeated flashes of the LED 2. LED 1 and LED 2 are alternatively flashed such that while LED 1 is on, LED 2 is off, and vice versa. While the target is positioned within the field of view corresponding to LED 1 but not within the field of view corresponding to LED 2, the sensed voltage related to flashing of LED 1 is high, but the sensed voltage related to flashing of the LED 2 is low. In a simplified sense, this corresponds to a target positioned over, or near, LED 1. While the target is positioned in the middle, between the two LEDs 1 and 2, the photo sensor 4 detects reflected light from flashing of both LED 1 and LED 2 resulting in high sensed voltage levels corresponding to both LED 1 and LED 2. While the target is positioned over, or near, LED2, the sensed voltage related to flashing of LED 2 is high, but the sensed voltage related to flashing of the LED 1 is low. When the target is not positioned over either LED 1 or LED 2 or between LED 1 and LED 2, the photo sensor 4 does not sense reflected light associated with either and the corresponding sensed voltage levels are low.

For left to right motion, the sensed voltage level for "signal from LED 1" goes high before the sensed voltage level for "signal from LED 2", as shown in the Left to Right Motion signals of FIG. 2. In other words, the voltage versus time curve of "signal from LED 2" is delayed relative to the voltage versus time curve of "signal from LED 1" when the target is moving from left to right.

FIG. 2 also shows the sensed voltage signals for the case of right to left motion. For right to left motion, the sensed voltage level for "signal from LED 2" goes high before the sensed voltage level for "signal from LED 1", as shown in the Right to Left Motion signals of FIG. 2. In other words, the voltage versus time curve of "signal from LED 1" is delayed relative to the voltage versus time curve of "signal from LED 2" when the target is moving from right to left.

Up and down motion, where up and down are considered to be motion in the y-axis, is similarly determined using LEDs 2 and 3 and the corresponding voltage versus time data. The control circuit 5 receives the sensed voltage from the photo sensor 4 and determines relative target motion in the y-axis in a similar manner as that described above in relation to the x-axis.

A disadvantage of the multiple illumination source configuration is the multiple number of illumination source components that must be integrated within the device. With ever decreasing device size, additional components are undesirable.

SUMMARY OF THE INVENTION

Embodiments of a gesture sensing device includes a single light source and a multiple segmented single photo sensor, or an array of photo sensors, collectively referred to herein as segmented photo sensors. A light modifying structure relays reflected light from the light source onto different segments of the segmented photo sensors depending on a location of a target, such as a hand or finger. The light modifying structure can be an optical lens structure or a mechanical structure. The different segments of the photo sensor sense reflected light and output corresponding sensed voltage signals. A control circuit receives and processes the sensed voltage signals to determine target motion relative to the segmented photo sensor. The control circuit includes an algorithm configured to calculate one of more differential analog signals using the sensed voltage signals output from the segmented photo sensors. In some embodiments, a vector is determined according to the calculated differential analog signals, the vector is used to determine a direction and/or velocity of the target motion.

In an aspect, a method of detecting a gesture is disclosed. The method includes configuring a segmented sensor having a plurality of segments that each output a segment signal corresponding to light sensed by the segment; calculating one or more differential signals according to the segment signals output from the plurality of segments; and determining a target motion direction of a target passing the segmented sensor by applying vector analysis to the one or more differential signals.

The method can also include determining a proportional value of a target motion velocity of the target passing the segmented sensor by applying vector analysis to the one or more differential signals. In some embodiments, the light sensed by the segment comprises light originated from an illumination source and reflected off the target. In other embodiments, the light sensed by the segment comprises ambient light. In some embodiments, the one or more differential signals comprise one or more differential composite signals, wherein a composite signal is a signal formed from the addition of two or more segment signals.

Calculating one or more differential signals can include calculating a first differential signal indicating the target motion direction along an x-axis. In some embodiments, the first differential signal includes a positive maximum value and a negative maximum value. The target motion direction can determined to be in a positive x-direction if the positive maximum value precedes the negative maximum value in time, and the target motion direction can be determined to be in a negative x-direction if the negative maximum value precedes the positive maximum value in time. Calculating one or more differential signals can include calculating a second differential signal indicating the target motion direction along a y-axis. In some embodiments, the second differential signal includes a positive maximum value and a negative maximum value. The target motion direction can be determined to be in a positive y-direction if the positive maximum value precedes the negative maximum value in time, and the target motion direction can be determined to be in a negative y-direction if the negative maximum value precedes the positive maximum value in time.

The method can also include calculating a proportional value of a target motion velocity along the x-axis using a time difference between successive zero crossings of the first differential signal, and calculating a proportional value of a target motion velocity along the y-axis using a time difference between successive zero crossings of the second differential signal. The method can also include superimposing the proportional value of the target motion velocity along the x-axis and the proportional value of the target motion velocity along the y-axis to form a target vector. The method can also include determining one of a predefined set of directions according to the target vector. The predefined set of directions can include a positive x-direction, a negative x-direction, a positive y-direction, and a negative y-direction. In some embodiments, the target vector has a target vector angle and determining one of the predefined set of directions comprises comparing the target vector angle to a set of defined threshold angles. In other embodiments, determining one of the predefined set of directions comprises comparing the target vector to a set of predefined distribution patterns, each distribution pattern corresponding to one of the directions in the predefined set of directions. In this alternative embodiment, comparing the target vector can include determining a confidence value associated with comparing the target vector to each distribution pattern, and selecting one of the predefined set of directions according to the highest confidence value.

In another aspect, an apparatus is disclosed that includes a segmented sensor having a plurality of segments that each output a segment signal corresponding to light sensed by the segment; a memory configured to store the segment signals; and a processor coupled to the memory. The processor includes program instructions configured to: calculate one or more differential signals according to the segment signals output from the plurality of segments; and determine a target motion direction of a target passing the segmented sensor by applying vector analysis to the one or more differential signals.

DETAILED DESCRIPTION OF THE EMBODIMENTS

Embodiments of the present application are directed to a gesture sensing device and corresponding algorithm for detecting gestures. Those of ordinary skill in the art will realize that the following detailed description of the device and algorithm is illustrative only and is not intended to be in any way limiting. Other embodiments of the device and algorithm will readily suggest themselves to such skilled persons having the benefit of this disclosure.

Reference will now be made in detail to implementations of the device and algorithm as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions will likely be made in order to achieve the developer's specific goals, such as compliance with application and business related constraints, and that these specific goals can vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of a gesture sensing device include a single light source and a multiple segmented single photo sensor, or an array of photo sensors. By adding a light modifying structure, such as an optical lens structure or a mechanical structure, light reflected from a proximate target, such as a hand or finger, can be focused and/or directed onto different segments of the photo sensor depending on the target position relative to the segmented photo sensor. The different segments of the photo sensor sense reflected light at the same time, and the relative amplitude from each segment is indicative of movement of the target. A control circuit receives and processes the sensed data from the segmented photo sensor to determine target motion relative to the segmented photo sensor. The one light sensor configuration is more compact and less expensive than multiple source configurations. Another advantage of the gesture sensing device is that a user can convey a device command through gesturing without the need to activate a touch screen controller, or use of mechanical buttons. This provides significant power and cost savings.

Figure 3:
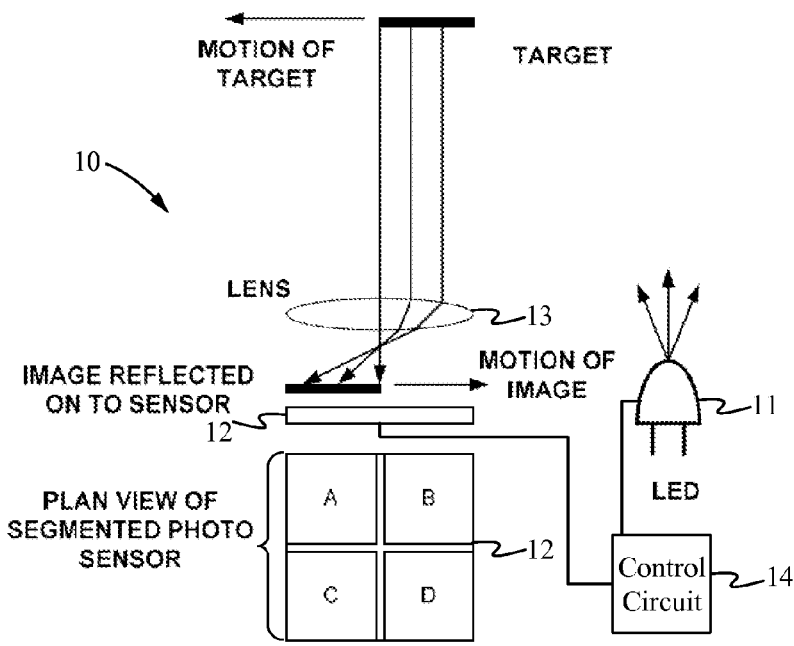
FIG. 3 illustrates a conceptual diagram of the gesture sensing device according to an embodiment.

FIG. 3 illustrates a conceptual diagram of the gesture sensing device according to an embodiment. The gesture sensing device 10 includes a single illumination source, represented as LED 11, and a segmented photo sensor 12. In some embodiments, the segmented photo sensor 12 is configured to sense only a specific wavelength or wavelengths of light, such as the wavelengths emitted by the illumination source 11. Such a configuration can be implemented through the use of a filter. The segmented photo sensor 12 can be either a single sensor functionally partitioned into multiple segments or an array of individual photo sensors. For example, a quad segmented photo sensor is functionally equivalent to four individual photo sensors arranged in a quad layout. As used herein, reference to a "segment" refers to either a partitioned segment within a single sensor or to an individual sensor in an array of sensors. FIG. 3 shows the segmented photo sensor 12 in both an on-edge view (upper element labeled 12) and a plan view to show the different segments (lower element labeled 12).

In the exemplary configuration of FIG. 3, the segmented photo sensor 12 includes four segments, segment A, segment B, segment C, and segment D. Although a four segment detector is the simplest implementation, it is understood that the number of segments can be increased to increase the resolution of the system. The signal processing electronics become increasingly more complex as the number of segments is increased. Each of the segments is isolated from each other. The LED 11 is positioned proximate to the segmented photo sensor 12. When a moving target passes proximate to the LED 11 and into a corresponding field of view of the segmented photo sensor 12, light output from the LED 11 is reflected off the moving target and to the segmented photo sensor 12. The gesture sensing device 10 also includes an optical lens structure 13 to focus light onto the segmented photo sensor 12. The focusing lens focuses reflected light from a moving target, such as a hand gesture, in the space above the segmented photo sensor 12. It is understood that only reflected light that is within the "field of view" is focused onto the segmented photo sensor 12. Although shown as a single element 13 in FIG. 3, the optical lens structure 13 represents any number of lens and/or optical elements for directing light to the segmented photo sensor 12. An exemplary implementation of an optical lens structure and/or light sensor is described in the co-owned and co-pending U.S. Provisional Patent Application Ser. No. 61/490,568, filed May 26, 2011, and entitled "Light Sensor Having Glass Substrate With Lens Formed Therein" and the co-owned and co-pending U.S. Provisional Patent Application Ser. No. 61/491,805, filed May 31, 2011, and entitled "Light Sensor Having Glass Substrate With Lens Formed Therein", which are both incorporated in their entireties by reference. Each segment of the segmented photo sensor 12 outputs a segment signal to a control circuit 14, where the segment signals are processed.

The LED 11 is continuously or periodically energized to illuminate the target. The light reflected from the target induces the segment signal on each of the segmented photo sensors. These segment signals are processed and stored in a buffer memory, the buffer memory being integrated with or separate from the control circuit 14. The control circuit 14 analyzes the stored data and determines if a valid gesture has been detected. The same data can be also be used so that the segmented photo sensor 12 operates as a proximity detector. The same photo sensor structure can be used with a different signal processing circuit so that the gesture sensing device also functions as an ambient light sensor.

When the LED 11 is powered on, or flashes, the target is illuminated if the target is within a proximate space above the segmented photo sensor 12. The moving target is conceptually illustrated in FIG. 3 as a flat reflector. The target reflection is imaged by the optical lens structure 13 onto the segmented photo sensor 12. The example of FIG. 3 illustrates a right to left motion of the target. As the edge of the target moves through the center of the imaging zone, the focused image of the target edge moves across the segmented photo sensor 12. The segments A and C respond first to the moving image, followed by segments B and D. The control circuit 14 is programmed to detect this sequence of events, and recognizes a right to left target motion. Similarly, a left to right target motion can be recognized by the opposite sequence, and both up to down and down to up target motions can be recognized using the orthogonal set of signals. In and out target motion can be recognized by sensing the absolute amplitude of the sum of the four segments A–D, which is also the proximity measurement.

Figure 4:
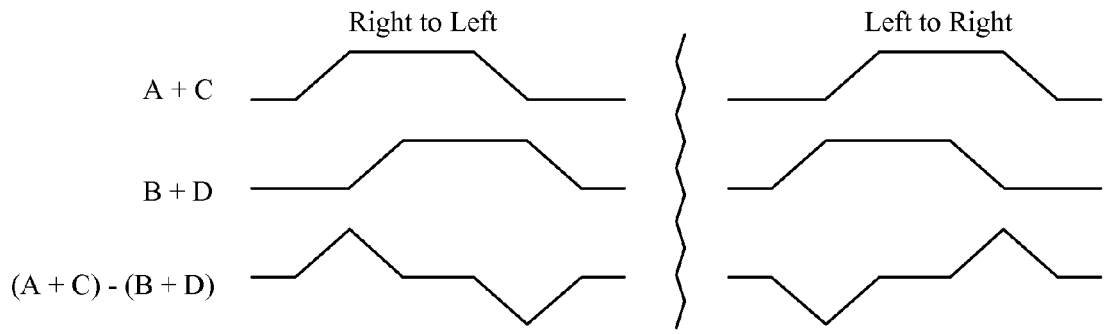
FIGS. 4 and 5 illustrate exemplary composite signals generated from signals output from the segmented photo sensor in response to a target moving in various directions.
Figure 5:
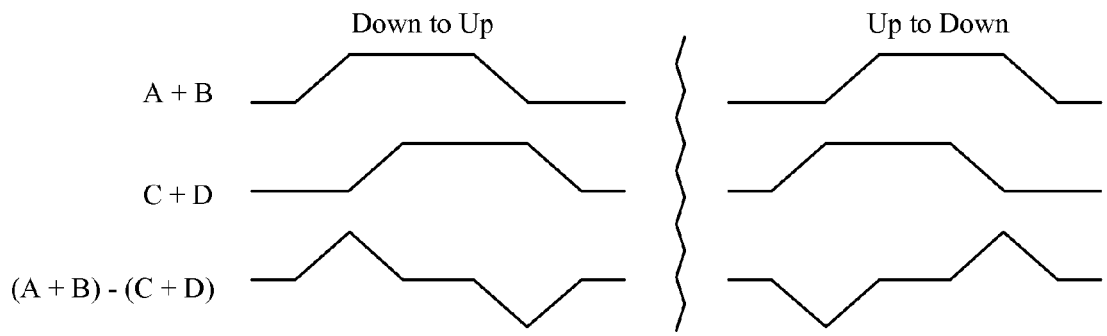

FIGS. 4 and 5 illustrate exemplary composite signals generated from signals output from the segmented photo sensor 12 in response to a target moving in various directions. A composite signal is a composite of two or more segment signals, each segment signal provides sensed voltage versus time data. The composite signals and method of analyzing the composite signals shown in FIGS. 4 and 5 show one exemplary method of how to analyze the segment signals for determining target motion. It is understood that alternative methods of analysis can be applied to the segment signals to determine relative target motion.

Referring to FIG. 4, to determine if a target is moving from right to left or from left to right, the segment signals from segment A and segment C are added together to form composite signal A+C, and the segment signals from segment B and segment D are added together to form composite signal B+D. FIG. 4 illustrates exemplary composite signals corresponding to the determination of right to left or left to right motion of the target. The composite signal B+D is subtracted from the composite signal A+C to form a differential composite signal (A+C)−(B+D). If right to left motion is present, the differential composite signal (A+C)−(B+D) has a positive peak followed by a negative peak, as shown in the bottom left curve of FIG. 4. If left to right motion is present, the differential composite signal (A+C)−(B+D) has a negative peak followed by a positive peak, as shown in the bottom right curve of FIG. 4.

Notice in FIG. 3, that the direction of motion of the target is opposite that of the direction of motion of the image on the segmented photo sensor 12. Image inversion is a result of the optical lens structure 13. In alternative embodiments, described in detail below, the optical lens structure is replaced by one of a number of mechanical structures. In some embodiments of these alternative configurations, the image on the segmented photo sensor 12 moves in the same direction as the target, and the composite signals (A+C) and (B+D) shown in FIG. 4 are swapped and the differential composite signal (A+C)−(B+D) is inverted. As shown in FIG. 3, when the target moves from right to left, the image on the segmented photo sensor 12 moves from left to right. As applied to FIG. 4, when the target moves from right to left, then the image initially appears on segments A and C as the target is on the right, but the image does not yet appear on segments B and D, and the resulting composite signal A+C starts to increase, as shown in the top left curve of FIG. 4, but the composite signal B+D remains at zero. As the target moves to the left, the image starts to appear on segment B+D while still appearing on segments A+C, and the resulting composite signal B+D starts to increase, as shown in the middle left curve of FIG. 4. Eventually, the image fully appears on all segments A–D. When the trailing edge of the target image moves off of segments A and C, the composite signal A+C returns to zero, and the negative peak of the differential composite signal (A+C)−(B+D) is formed.

Similarly, when the target moves from left to right, then the image initially appears on segments B and D as the target is on the left, but the image does not yet appear on segments A and C, and the resulting composite signal B+D starts to increase, as shown in the top right curve of FIG. 4, but the composite signal A+C remains at zero. As the target moves to the right, the image starts to appear on segment A+C while still appearing on segments B+D, and the resulting composite signal A+C starts to increase, as shown in the middle right curve of FIG. 4. Eventually, the image fully appears on all segments A–D. When the trailing edge of the target image moves off of segments B and D, the composite signal B+D returns to zero, and the positive peak of the differential composite signal (A+C)−(B+D) is formed.

Up and down movement is similarly determined. To determine if a target is moving from up to down or from down to up, the segment signals from segment A and segment B are added together to form composite signal A+B, and the segment signals from segment C and segment D are added together to form composite signal C+D. FIG. 5 illustrates exemplary composite signals corresponding to the determination of up to down or down to up motion of the target. The composite signal C+D is subtracted from the composite signal A+B to form a differential composite signal (A+B)−(C+D). If down to up motion is present, the differential composite signal (A+B)−(C+D) has a positive peak followed by a negative peak, as shown in the bottom left curve of FIG. 5. If up to down motion is present, the differential composite signal (A+B)−(C+D) has a negative peak followed by a positive peak, as shown in the bottom right curve of FIG. 5.

When the target moves from down to up, then the image initially appears on segments A and B, but the image does not yet appear on segments C and D. The resulting composite signal A+B starts to increase, as shown in the top left curve of FIG. 5, but the composite signal C+D remains at zero. As the target moves downward, the image starts to appear on segment C+D while still appearing on segments A+B, and the resulting composite signal C+D starts to increase, as shown in the middle left curve of FIG. 5. Eventually, the image fully appears on all segments A–D. As in the right to left motion, with down to up motion the differential composite signal (A+B)−(C+D) exhibits a positive peak followed by a negative peak, as shown in the bottom left curve of FIG. 5. It can be easily seen that the opposite motion, up to down, forms a similar differential composite signal (A+B)−(C+D), but with the opposite phase, as shown in the bottom right curve of FIG. 5.

Additional processing is performed to determine motion toward and away from the segmented photo sensor, referred to as in and out motion. To determine in and out motion, all four segments A, B, C, D are added to form a composite signal A+B+C+D. If the composite signal A+B+C+D increases over a given time period, then it is determined that there is motion toward the segmented photo sensor, or inward. If the composite signal A+B+C+D decreases over a given time period, then it is determined that there is motion away from the segmented photo sensor, or outward.

In general, the segments are measured and the segment signals are processed as appropriate to determine changes in magnitude of the composite signals. These changes in magnitude, when compared temporally with changes in magnitude of other composite signals, determine relative motion of a target reflecting light back to the segmented photo sensor.

In alternative embodiments, mechanical structures are used in place of the optical lens structure. Mechanical structures are used to influence how the reflected light is directed to the segmented photo sensor. A first mechanical structure is referred to as a sundial configuration. The sundial configuration implements a physical "wall" protruding from a sensor surface of the segmented photo sensor. The wall effectively casts a "shadow" on various sensor segments as the target moves across the space above the segmented photo sensor. This shadow is tracked and target motion is correspondingly determined.

Figure 6:
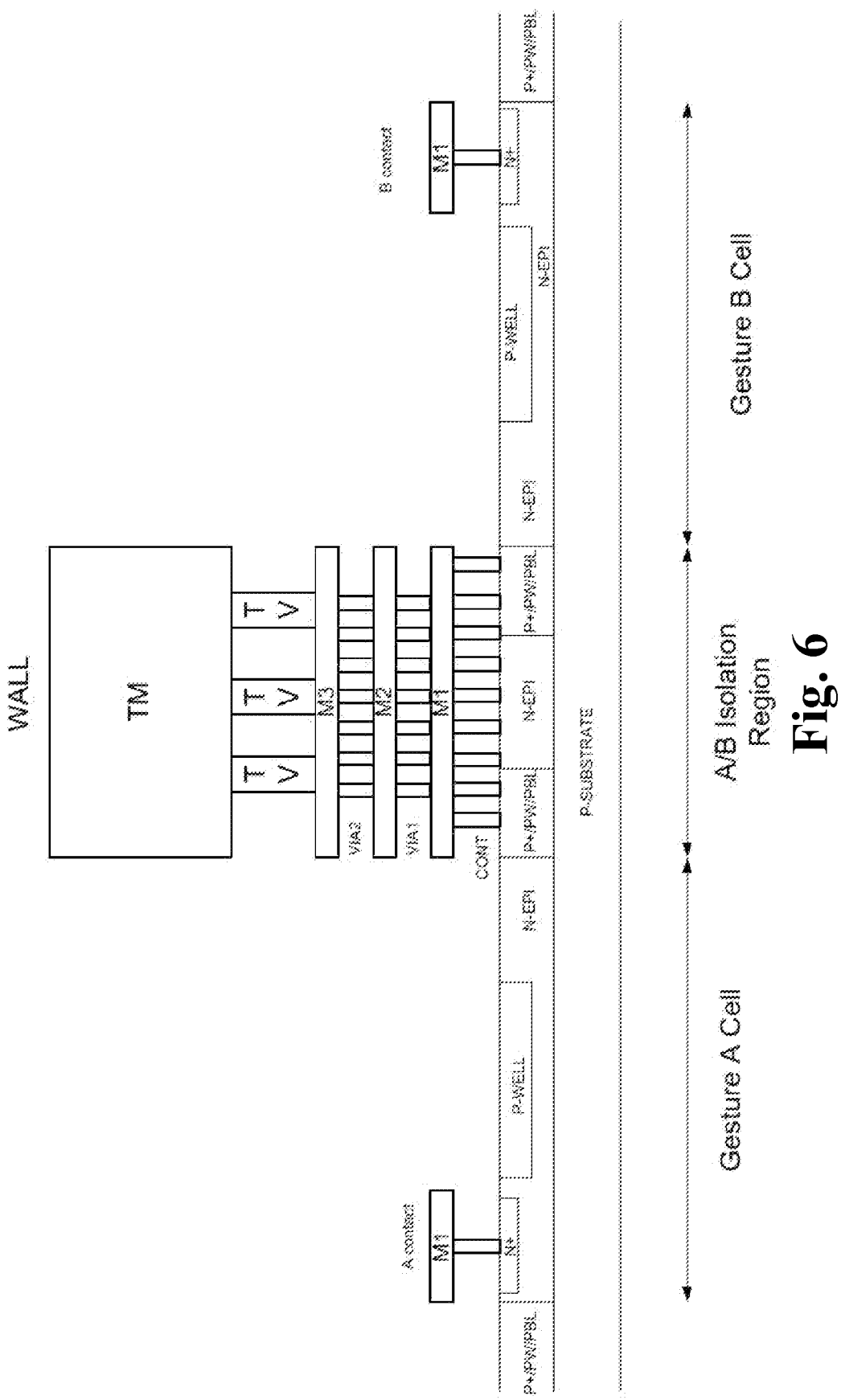
FIG. 6 illustrates a cross section view of a sundial configuration according to an embodiment.

FIG. 6 illustrates a cross section view of a sundial configuration according to an embodiment. The sundial configuration provides a mechanical means for directing reflected light onto a photo sensor, in this case a photodiode. The center structure is the physical sundial wall used to block reflected light. The two N-EPI to P-SUBSTRATE junctions on either side of the wall form two photodiodes. The wall is a series of metal layers built up to separate the two photo diodes. In the exemplary configuration of FIG. 6, the wall includes a first metal layer M1, a second metal layer M2, a third metal layer M3, and a top metal layer TM. Each metal layer is separated by a passivation layer, such as silicon dioxide within which through-vias are formed. The metal layers, passivation layers, and through-vias are formed using conventional semiconductor processing techniques. The wall is formed on a substrate doped to form the photodiodes, also referred to as a cell. The first photodiode, or photodiode cell A, is formed by an N-EPI to P-SUBSTRATE junction. A metal contact M1 is coupled to the N-EPI region in order to make contact to the photodiode cell A cathode. The P-SUBSTRATE serves as the photodiode anode, and it is common for both the photodiode cells A and B cells. There is an additional photodiode formed by adding a P-WELL layer on top of the N-EPI layer of photodiode cell A. A contact for the P-well is made at the end of the P-well, not shown in FIG. 6. In some embodiments, the P-well photodiode is used to measure ambient light when the gesture function is not used. Such a configuration and functionality is described in the co-owned U.S. patent application Ser. No. 12/889,335, filed on Sep. 23, 2010, and entitled "Double Layer Photodiodes in Ambient Light Sensors and Proximity Detectors", which is hereby incorporated in its entirety by reference. The second photodiode, or photodiode cell B, is formed in a manner identical to the photodiode A cell. The two photodiode cells A and B are isolated by two P+ diffusions that extend through the N-EPI region and contact the P-SUBSTRATE. An island of N-EPI is formed between the two P+ isolation diffusions. This island forms an additional diode that collects any stray photocurrent that might migrate from under photodiode cell A and otherwise be collected by photodiode cell B. The additional diode also collects any stray photocurrent that might migrate from under photodiode cell B and be otherwise collected by photodiode cell A. Together, the two P+ isolation diffusions and the N-EPI island in between them form the A/B isolation region. The three elements of the A/B isolation region are all shorted by the first metal layer M1, which is connected to ground at the top metal layer TM. Any photocurrent collected in the composite A/B isolation region is shunted to ground, reducing crosstalk between photodiode cell A and photodiode cell B.

Figure 7:
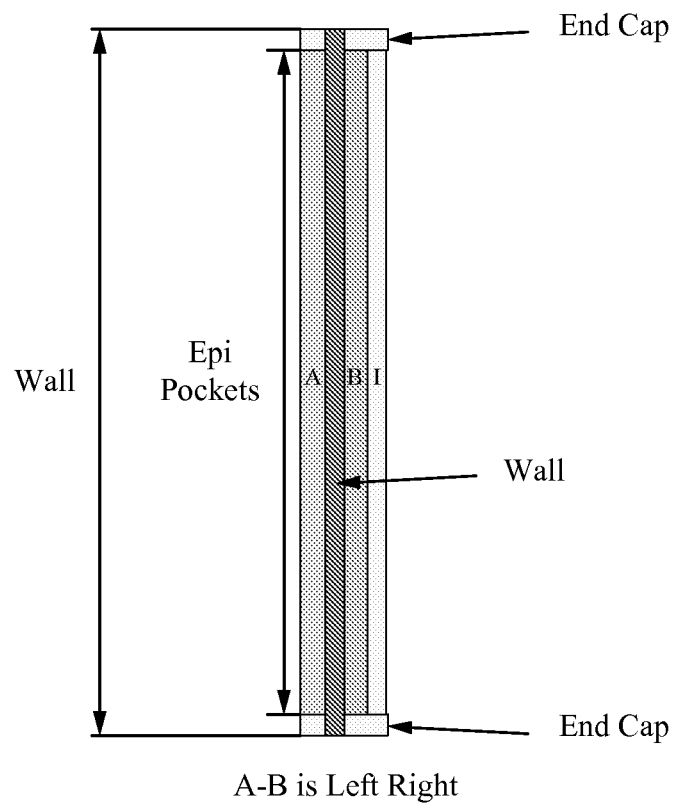
FIG. 7 illustrates a top down view of the cell of FIG. 6.
Figure 8:
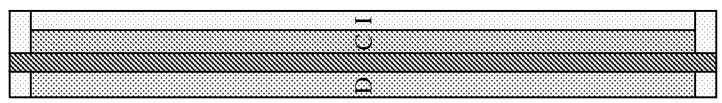
FIG. 8 illustrates the cell of FIG. 7 rotated by 90 degrees.
Figure 9:
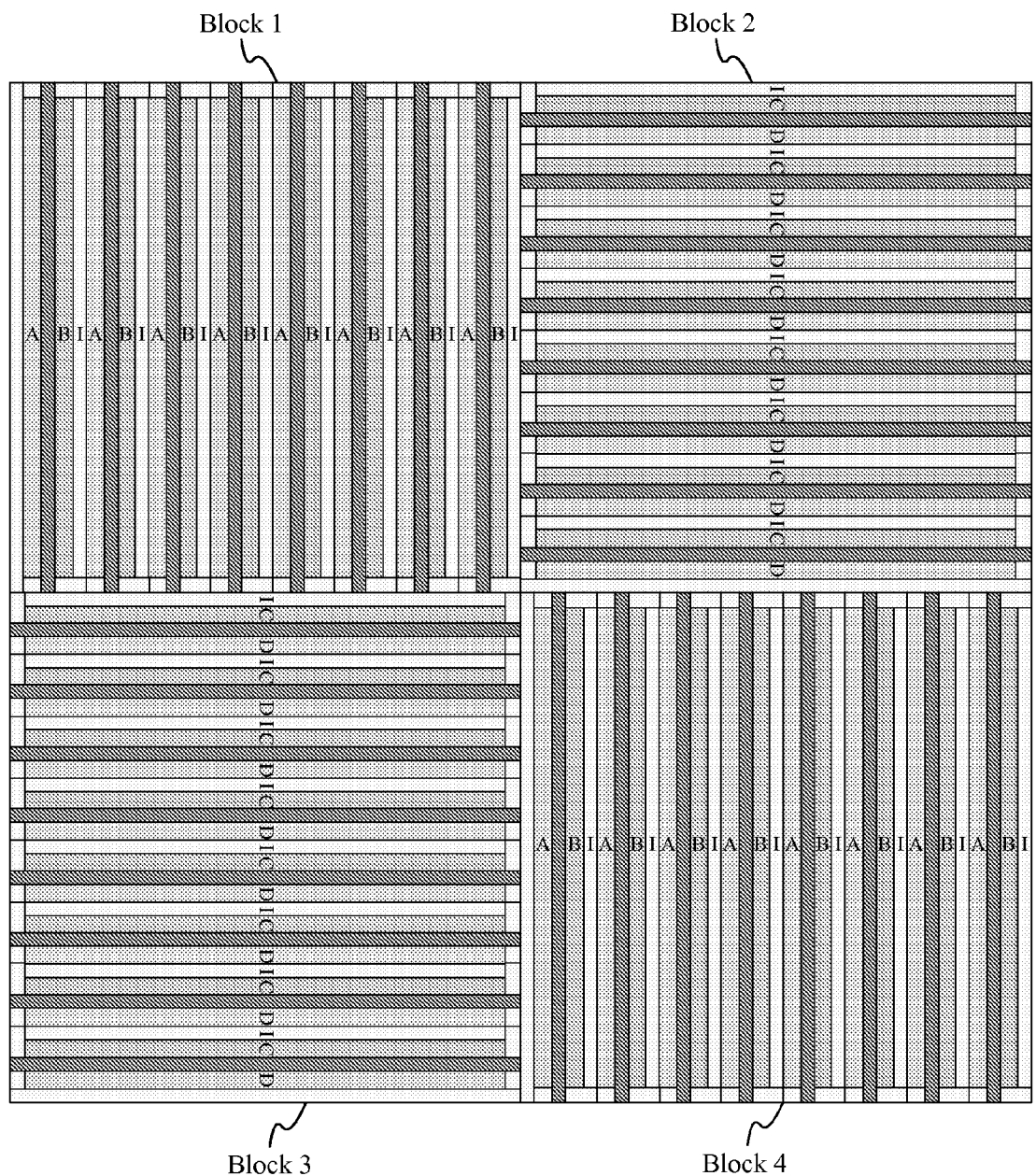
FIG. 9 illustrates a top down view of a plurality of cells configured to form four segments.

The structure in FIG. 6 is a cell that includes photodiode cell A, photodiode cell B, the isolation region, and the wall. FIG. 7 illustrates a top down view of the cell of FIG. 6. This cell is configured to determine left-right motion as the wall is aligned perpendicularly to the direction of motion, left-right, to be determined. To determine up-down motion, the cell is rotated 90 degrees, as shown in FIG. 8. In the cell configuration of FIG. 8, the wall structure is aligned perpendicularly to the up-down motion to be determined. A reason for creating cells is that the size of the photodiode cells is restricted, specifically the width of the photodiode cell extending away from the wall structure. This limits the surface area that can be used to measure the reflected light. FIG. 9 illustrates a top down view of a plurality of cells configured to form four blocks according to an embodiment. Each cell is isolated from an adjacent cell by an isolation region I. In FIG. 9, block 1 is made of an array of alternating photodiode cells A and B. Block 1 is identical to block 4 which also include an array of alternating photodiode cells A and B. All of the photodiode cells A in both blocks 1 and 4 are shorted together to form an aggregated A node. Aggregating the array of cells increases signal strength. Likewise, all of the photodiode cells B in both blocks 1 and 4 are aggregated together to form a single B node. The same connection scheme is used to form a C node and a D node from the array of alternating photodiode cells C and D in blocks 2 and 3. The photodiode cells in blocks 2 and 3 are rotated 90 degrees relative to the photodiode cells in blocks 1 and 4. In this manner, there are four distinct signals, one from each of nodes A, B, C, and D.

Target motion in the left-right and up-down directions is again determined by analyzing differential signals. To determine target motion in the left-right direction, the differential signal A−B is formed. The differential signal A−B is analyzed in a similar manner as the differential composite signal (A+C)−(B+D) related to the quad cell configuration of FIG. 3. To determine target motion in the up-down direction, the differential signal C−D is formed. The differential signal C−D is analyzed in a similar manner as the differential composite signal (A+B)−(C+D) related to the quad cell configuration of FIG. 3.

Figure 10:
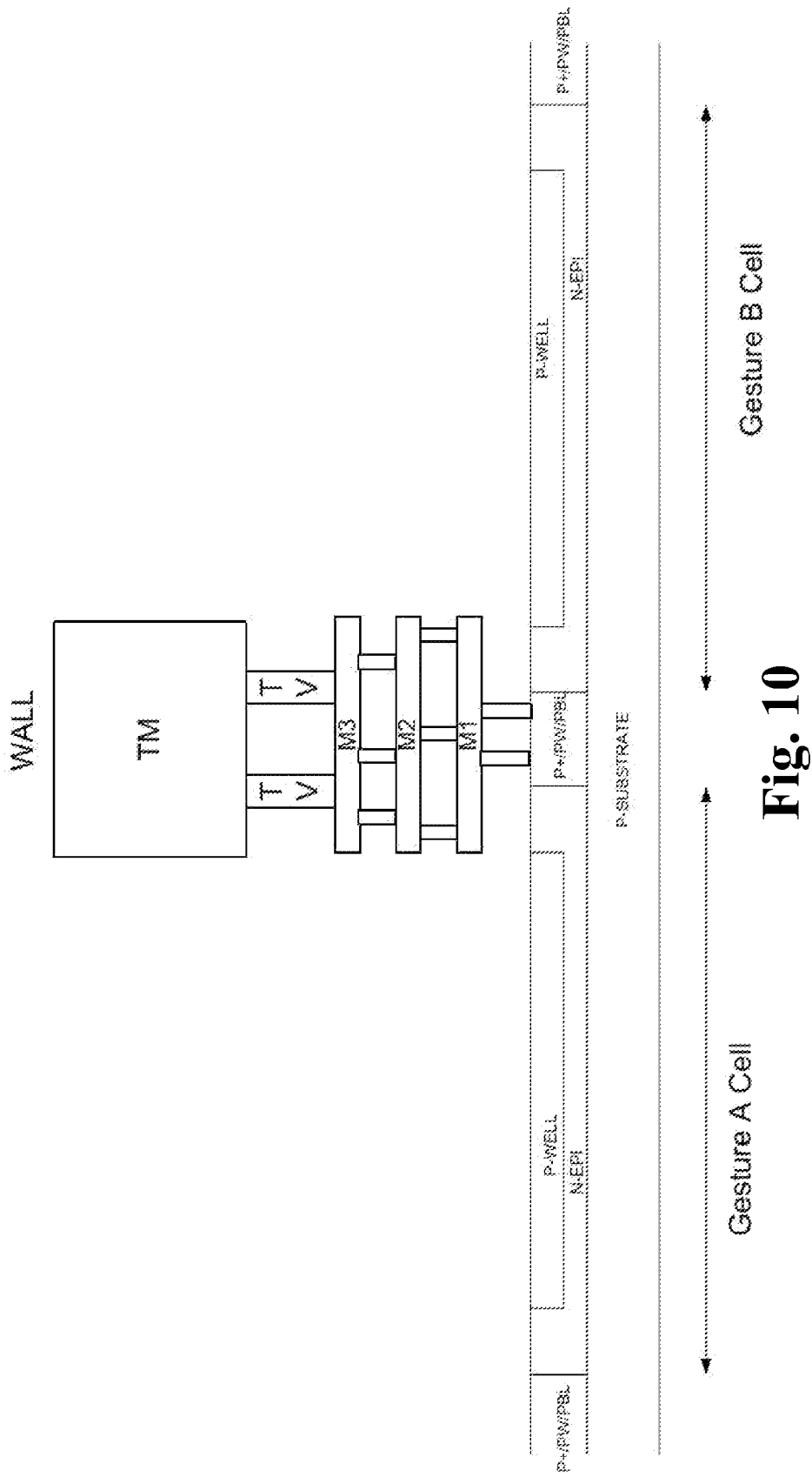
FIG. 10 illustrates a cross section view of a sundial configuration according to an alternative embodiment.

The cell structure shown in FIG. 6 is an exemplary sundial configuration and alternative structures are also contemplated. FIG. 10 illustrates a cross section view of a sundial configuration according to an alternative embodiment. In the alternative configuration of FIG. 10, the wall is alternatively formed, and the underlying substrate is alternatively doped. In this embodiment, the isolation region between the two photodiode cells A and B consists of a single P+ diffusion. The smaller isolation region of FIG. 10 compared to that of FIG. 6 allows for increased packing density. P-WELL and N-EPI region contacts are made at the end of the array, not shown in FIG. 10. The P+ region in the substrate is connected to ground at the top metal layer TM.

Figure 11:
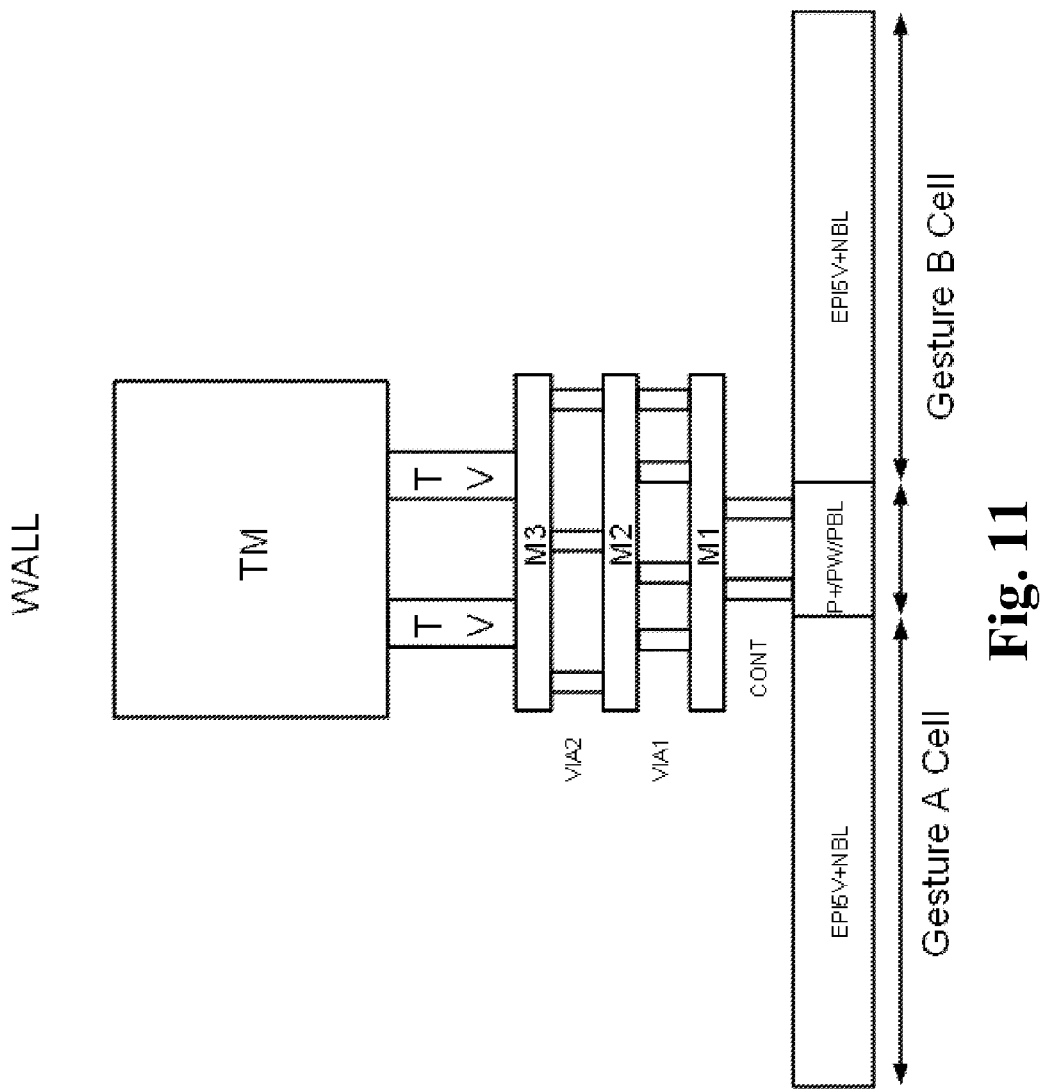
FIG. 11 illustrates a cross section view of a sundial configuration according to yet another alternative embodiment.

FIG. 11 illustrates a cross section view of a sundial configuration according to yet another alternative embodiment. In the alternative configuration of FIG. 11, the wall is alternatively formed, and the underlying substrate is alternatively doped. The photodiode cells do not include a P-WELL in this configuration. The N-EPI region contacts are made at the end of the array, not shown in FIG. 11. The P+ isolation region between the photodiode cells A and B is connected to ground at the top metal layer TM. In this embodiment, the absence of the P-WELL layer permits the fabrication of narrower photodiode cells A and B compared to that of FIG. 6. This structure affords higher cell packing density compared to that of FIG. 6.

Figure 12:
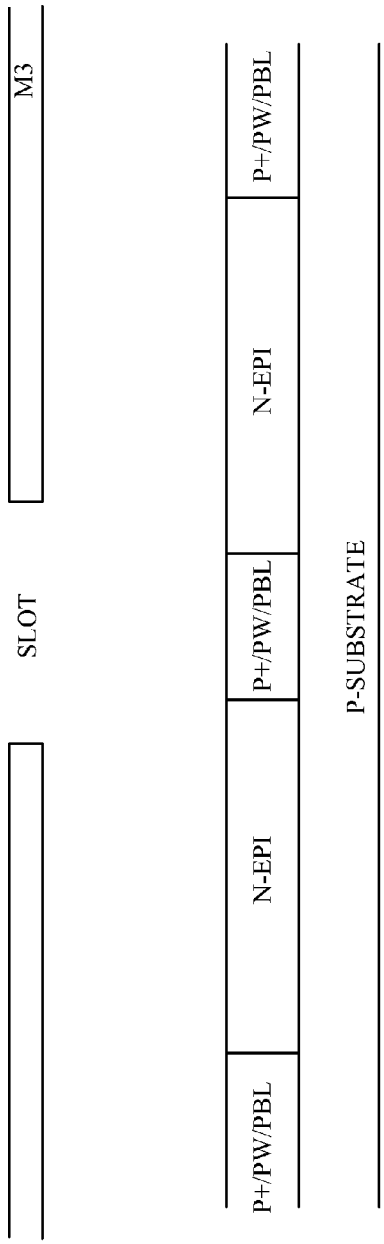
FIG. 12 illustrates a cross section view of a pinhole configuration according to an embodiment.
Figure 13:
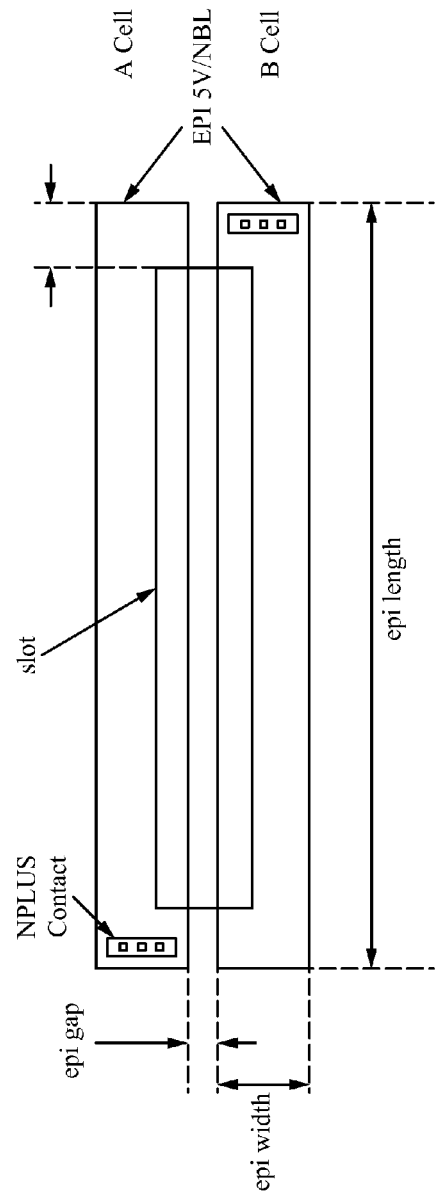
FIG. 13 illustrates a top down plan view of the cell of FIG. 12.

A second mechanical structure is referred to as a pinstripe configuration. FIG. 12 illustrates a cross section view of a pinstripe configuration according to an embodiment. The pinstripe configuration provides a mechanical means for directing reflected light onto a photo sensor, in this case a photodiode. The pinstripe configuration is analogous to a pinhole camera, where the pinhole has been elongated into a stripe or slot. The two N-EPI sections in the substrate form the cathodes of photodiode cells A and B, with the P-SUBSTRATE forming the common anode. A metal layer M3 is formed over the cell, and an open slot is formed in the metal layer. The metal layer is formed over an interlayer dielectric, such as silicon dioxide, which is optically transparent. The metal layer and open slot are formed using conventional semiconductor manufacturing processes. In some embodiments, the cell structure is formed using conventional CMOS, digital semiconductor manufacturing processes. FIG. 13 illustrates a top down plan view of the cell of FIG. 12. As shown in FIG. 13, the open slot is aligned along a length of the cell. The open slot can run the entire length or partial length of the cell In operation, reflected light passes through the open slot and impinges the photodiodes, N-EPI sections. When a target position is on the right side of the open slot, light reflected from the target passes through the open slot and impinges the left side photodiode cell A. As the target moves from right to left, more reflected light impinges the left side photodiode cell A until the target passes a critical angle where less reflected light impinges the left photodiode cell A and instead, reflected light begins to impinge the right side photodiode cell B. When the target is directly overhead the slot, at a crossover point, the signals received from the photodiode cells A and B are the same. This is the position of highest overall signal strength, and is also where the difference between the two signals, A–B, is zero. As the target continues moving to the left, more reflected light impinges the right side photodiode cell B, and the difference signal, A–B, changes sign and becomes negative. After further leftward motion of the target, zero reflected light impinges the left side photodiode cell A. Similarly to the sundial configurations, a plurality of cells of the pinhole configuration are adjacently positioned to form a block, and the signals from the individual photodiode cells A are aggregated together to form the common A node. The same type of signal aggregation is used for the B through D signals. The alignment of the open slot determines the direction of target motion to be determined. For example, the horizontal alignment of the open slot in FIG. 13 is used to determine up-down motion. A plurality of cells aligned such as the cell in FIG. 13 form a segment configured to measure up-down motion. Vertical alignment of the open slot is used to determine left-right motion. In an exemplary configuration, the segments having the pinstripe configuration are aligned in a similar manner as those segments having the sundial configuration as shown in FIG. 9 where segments A and D are configured to determine left-right motion and segments B and C are configured to determine up-down motion. Target motion in the left-right and up-down directions is determined using the differential signals in the same manner as the sundial configuration described above.

In alternative configurations, the metal layer and open slot can be replaced by any type of light obscuring element that enables light to enter through a defined area and block light elsewhere, such as a MEMS (micro-electro-mechanical systems) device or other levered, or partially floating element, where the obscuring element is supported by an optically transparent material or suspended over air proximate the open slot. A MEMS device is a very small mechanical device driven by electricity.

Figure 19:
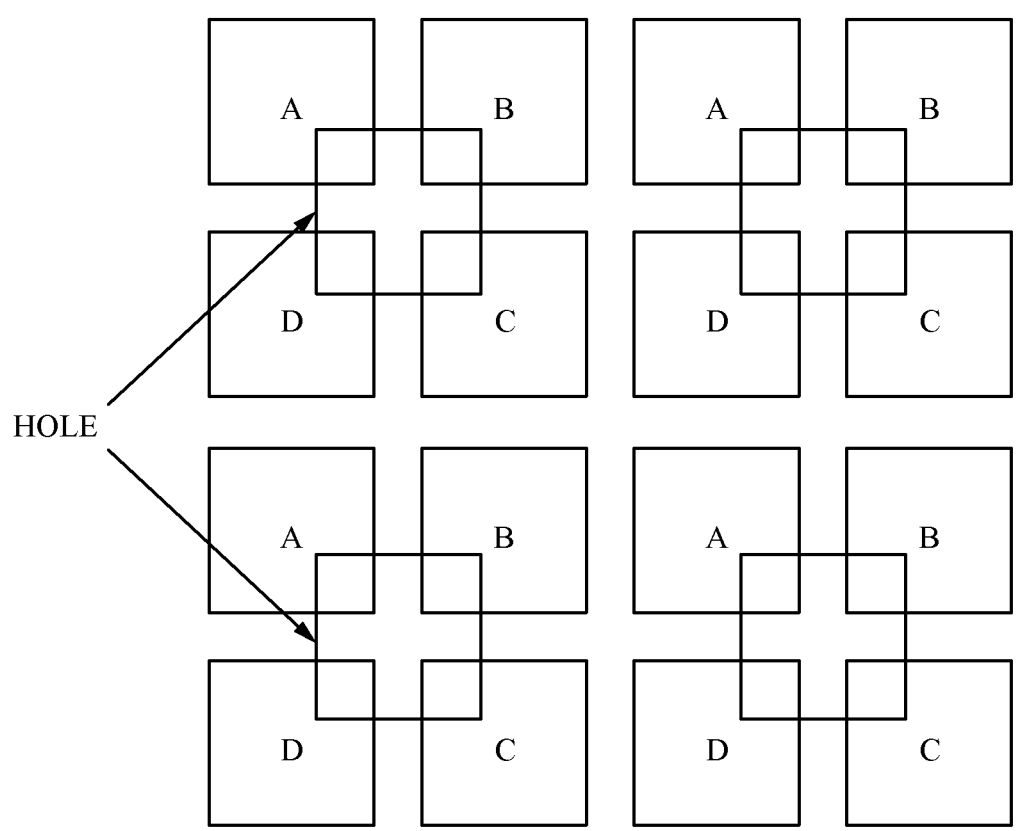
FIG. 19 illustrates a top down view of a micro quad cell configuration according to an embodiment.

An alternate embodiment is the application of the pinstripe concept to the quad cell design to produce a micro quad cell. FIG. 19 illustrates a top down view of a micro quad cell configuration according to an embodiment. The micro quad cell consists of an array of small quad cells. All of the individual A segments are aggregated together to form a single A signal, and likewise so are the B, C, and D segments. The array of quad cells is covered by a metal layer that has square or round openings that let light through. The metal layer is formed in a manner similar to that described for the pinstripe concept, using a semiconductor process. The dimensions of the quad cells A through D, the metal layer spacing, and the dimension of the opening in the metal layer are consistent with the dimensions typically available in semiconductor processes. The openings in the metal layer are positioned so that when light is directly overhead the opening, all cells are equally, but partially illuminated. When the angle of the light changes, the relative illumination of the four cells becomes imbalanced. The four signals, A through D, are processed in a manner identical to that described previously for FIG. 3.

Figure 14:
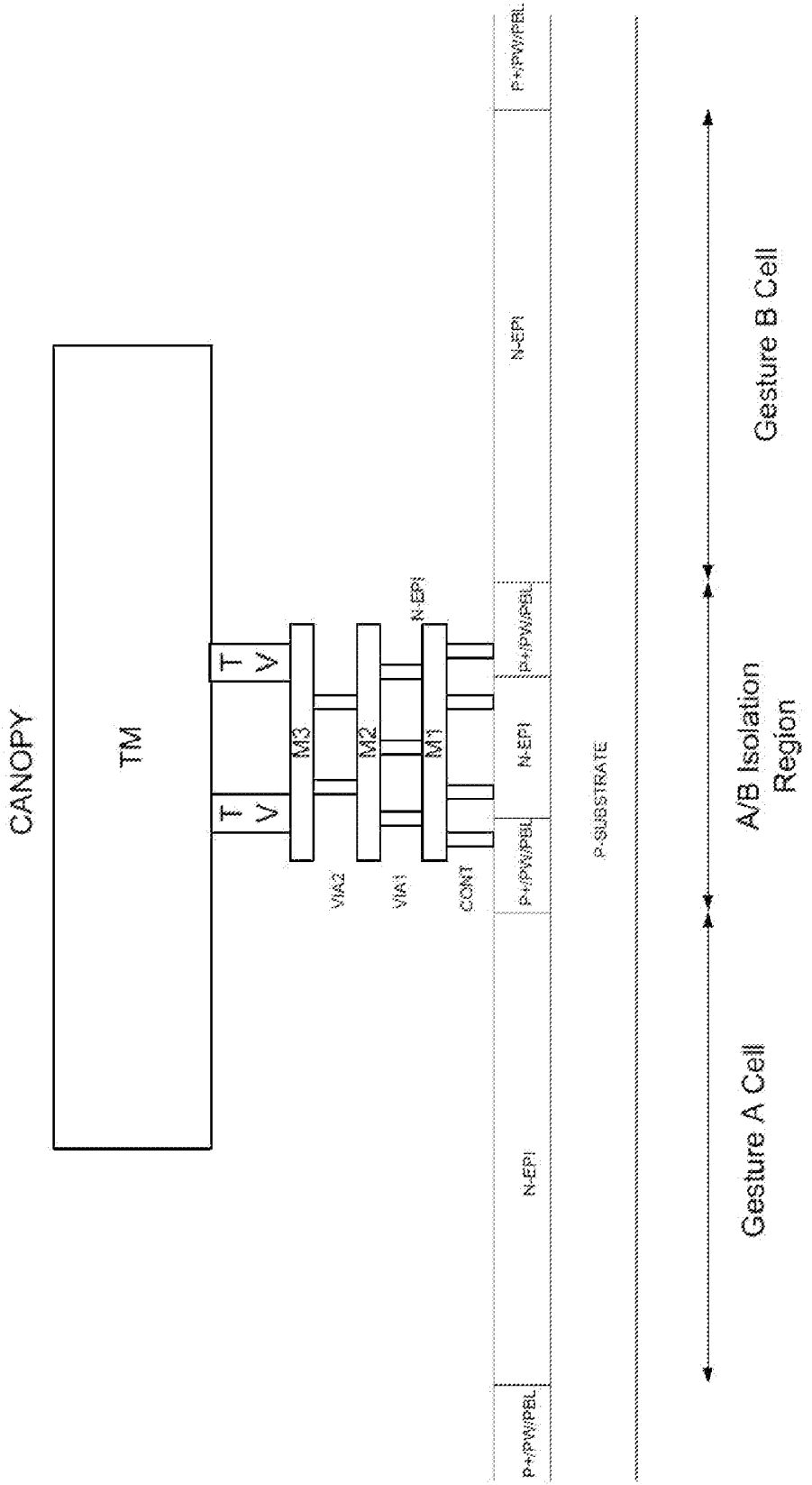
FIG. 14 illustrates a cross section view of a canopy configuration according to an embodiment.

A third mechanical structure is referred to as a canopy configuration. The canopy configuration operates similarly as the pinstripe configuration except that instead of reflected light accessing the photodiodes of a cell through an open slot in the center of the cell structure, as in the pinhole configuration, the center of the cell structure is covered by a "canopy" and the peripheral sides of the structure are open to allow reflected light to access the photodiodes of the cell. FIG. 14 illustrates a cross section view of a canopy configuration according to an embodiment. The canopy configuration provides a mechanical means for directing reflected light onto a photo sensor, in this case a photodiode. The two N-EPI sections form photodiode cells A and B. A top metal layer TM forms a canopy over the center of the cell structure, thereby covering an inner portion of the photodiodes but not covering an outer portion. The top metal layer is a top layer of a wall formed as a series of metal layers built that separate the two photodiode cells A and B. The wall structure is formed in a similar manner as the wall structures of the sundial configurations, except that the top metal layer TM of the canopy configuration extends over portions of the two photodiode cells A and B. The portion of the top metal layer TM that extends over the two photodiodes cells A and B is formed over an interlayer dielectric (not shown), such as silicon dioxide, which is optically transparent. Similarly to the pinstripe configuration and sundial configurations, a plurality of cells of the canopy configuration are adjacently positioned to form a segment, and multiple segments are configured and oriented to determine left-right and up-down motion. Reflected light is sensed by the photodiode cells A and B, and the sensed voltage is collected and processed similarly as for the pinstripe configuration and sundial configuration described above.

Figure 15:
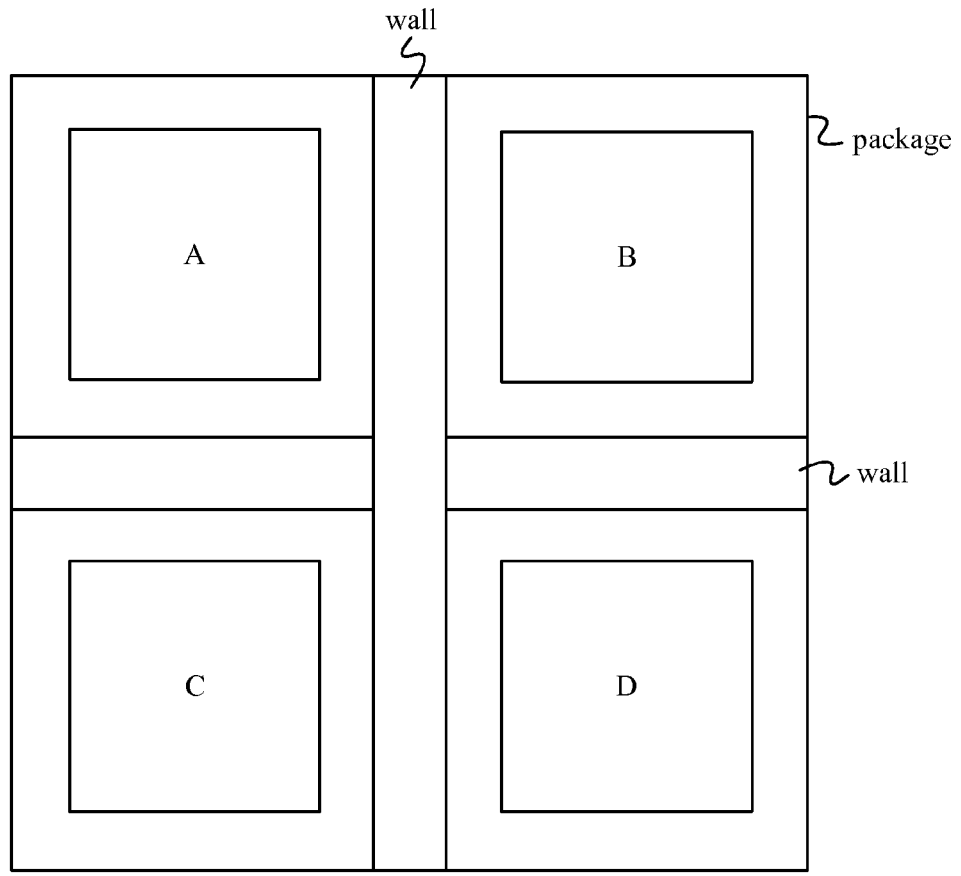
FIG. 15 illustrates a top down view of a corner quad configuration according to an embodiment.
Figure 16:
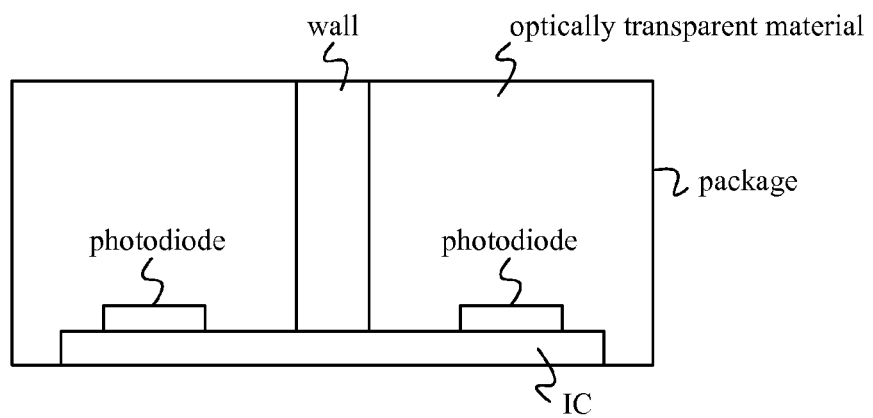
FIG. 16 illustrates a cross section view of the corner quad configuration of FIG. 15.

A fourth mechanical structure is referred to as a corner quad configuration. The corner quad configuration is similar conceptually to the sundial configuration in the use of a physical wall positioned between photo sensing elements, but instead of implementing the wall at the silicon level and having a plurality of cells for each segment, as in the sundial configuration, the corner quad configuration is implemented at the chip package level where a wall is formed between the segments. FIG. 15 illustrates a top down view of a corner quad configuration according to an embodiment. FIG. 16 illustrates a cross section view of the corner quad configuration of FIG. 15. In the exemplary configuration shown in FIGS. 15 and 16, photo sensor segments A–D are formed as four photodiodes on an integrated circuit chip. The four photodiodes can be considered as identical to the four photodiodes of FIG. 3, except that instead of using the closely spaced quad geometry of FIG. 3, the photodiodes are instead spaced apart and placed in the four corners of the substrate. The integrated circuit chip is packaged in a chip package that includes a wall made of optically opaque material that blocks light, such as the light reflected from a moving target. The portion of the chip package above the photodiodes is made of an optically transparent material. The height of the wall in the corner quad configuration is high enough so that each segment is a single sensor element, as opposed to a plurality of cells as in the sundial and canopy configurations. Determination of the target motion is determined in a similar manner as the sundial configuration without having to aggregate the individual cell voltages for a given segment. The corner quad configuration includes a wall that has a chip package level of magnitude versus the sundial configuration that includes a wall that has a transistor level of magnitude.

Figure 17:
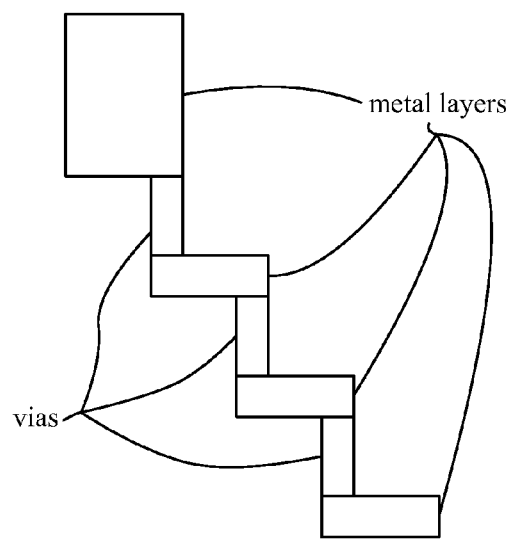
FIG. 17 illustrates an exemplary implementation of the angled walls used in the Venetian blinds configuration.
Figure 18:
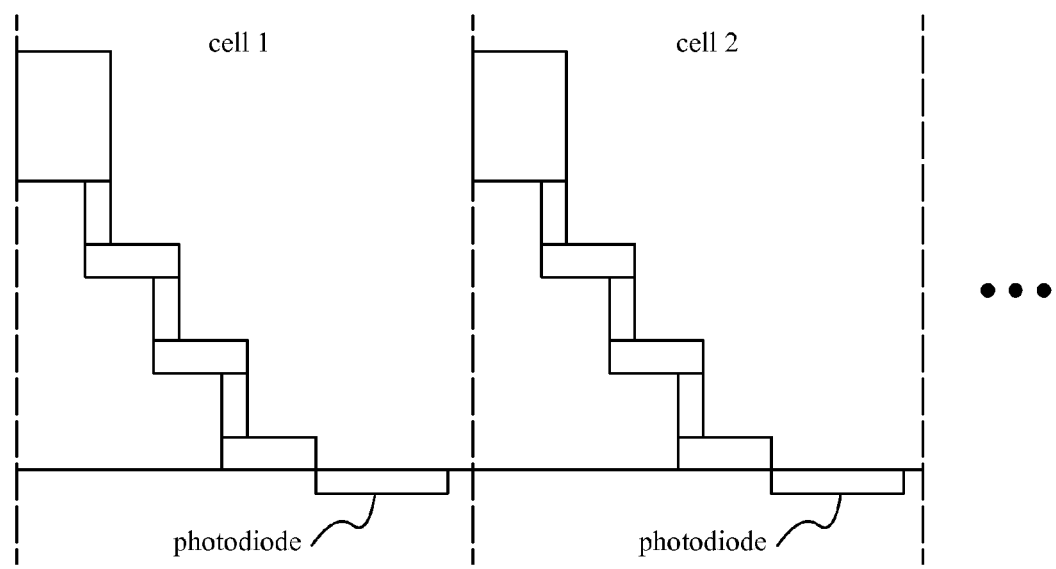
FIG. 18 illustrates adjacent cells in the Venetian blinds configuration.

A fifth mechanical structure is referred to as a Venetian blinds configuration. The Venetian blinds configuration is similar to the sundial configuration except that the wall structure in each cell is formed at a non-perpendicular angle to the photodiode cell(s), as opposed to the perpendicular angle as in the sundial configuration. The angled walls are fabricated by forming metal layers and through-vias in a stair step configuration, as shown in FIG. 17. Additionally, each cell in the Venetian blind configuration includes a single photodiode cell positioned on one side of the angled wall, as shown in FIG. 18. In the Venetian blind configuration, each of the four segments is facing a different 90 degree direction. For example, segment A is configured with the walls angled to the left, segment B is configured with the walls angled upward, segment C is configured with the walls angled downward, and segment D is configured with the walls angled to the right. In other words, each segment has a different field of view. Using these alignments, target motion in the left-right and up-down directions is determined using the differential signals in the same manner as the sundial configuration described above. It is understood that alternative alignments can be used.

In some embodiments, filters are added on top of the photo sensors to filter out light having wavelengths that are different than the illumination source.

The exemplary embodiments describe a gesture sensing device having four symmetrically configured segments, or photo sensors. It is understood that the concepts described herein can be extended to more than four segments configured symmetrically or asymmetrically, as in an N×N, N×M, circular, or other shaped array of photo segments or sensors. As previously described, a "segment" refers to either a partitioned segment within a single sensor or to a discrete sensor, or photodiode, in an array of sensors.

As previously described, the control circuit is configured to process the segment signals received from the segmented photo sensor. In particular, the control circuit includes an algorithm intended to recognize both the direction and speed of a gesture in two dimensions, for example some combination of left, right, up and down, to result in a "gesture vector". This can be extended to larger arrays of photodiodes to allow the formation of vector fields, which further increases the accuracy of the algorithm. A vector can be used for command identification, subsequent processing, or other application-specific uses. By being able to track speed, the effective number of recognizable gestures can be increased by a factor of two, if only "slow" and "fast" are used, or more, thereby providing increased functionality. The raw vector data can be used to define predetermined gestures or the raw vector data can be converted to a likelihood that the vector corresponds to one of the four cardinal directions or some other defined set of basis directions.

The algorithm also incorporates gesture recognition along the z-axis, for example toward or away from the segmented photo sensor. In some embodiments, the algorithm also includes finger tracking.

The algorithm is explained in the context of the gesture sensing device of FIG. 3. The LED 11 illuminates the target, which moves over the segmented sensor 12, resulting in light reflected off the target impinging the segmented sensor. The light modifying structure 13 conceptually represents any means for directing reflected light onto the segmented sensor 12, where the means for directing includes, but is not limited to, the optical means and mechanical means previously described. The image formed on the segmented sensor moves in a translated fashion related to the target motion. Composite signals are derived from the segmented signals output from the four segments A, B, C, D. Motion is determined by addition and subtraction of the segments signals, taken in different combinations for the two axes, X and Y, where the x-axis corresponds to left and right motion and the y-axis corresponds to up and down motion. Motion in the left and right direction is determined according to $X=(A+C)-(B+D)$, and motion is the up and down direction is determined according to $Y=(A+B)-(C+D)$. Motion toward or away from the segmented sensor, in the z-axis, is the total amount of light impinging all segments and is determined according to $Z=A+B+C+D$.

When an image moves from left to right over the segmented sensor, composite signal X first increases from zero to some positive value, then decrease below zero to some negative value before finally returning to zero. If the motion is purely in the x-direction, then the composite signal Y does not change much, and if it does, it only moves in one direction due to the segments being asymmetrically illuminated by a lighting source. The composite signal Z increases with illumination, regardless of the direction of movement along the x-axis or y-axis.

It is understood that the relationship between the direction of target motion and the corresponding direction of image motion on the sensor is dependent on the light directing mechanism used to direct reflected light onto the segmented sensor. FIG. 3 shows exemplary target motion from right to left. As previously described, target motion is inversely translated as image motion on the segmented sensor 12. For right to left target motion, there is corresponding left to right image motion, and vice versa. Similarly, for up to down target motion, there is corresponding down to up image motion, and vice versa. In the examples described above, there is an opposing relationship where the target motion direction is opposite that of the image motion direction. Alternative relationships are also contemplated.

Figure 20:
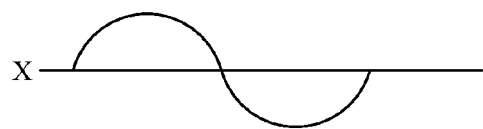
FIG. 20 illustrates an exemplary waveform corresponding to left to right image motion across the segmented sensor of FIG. 3.

FIG. 20 illustrates an exemplary waveform corresponding to left to right image motion across the segmented sensor 12 of FIG. 3. Left to right image motion corresponds to right to left target motion. As the target moves from the far right toward the segmented sensor 12, an image eventually begins to appear on the segments A and C. As the target continues moving from right to left, more and more of the target is imaged onto the segments A and C, resulting in an increasing X value. At some point, a maximum image is sensed on segments A and C, which corresponds to the point just prior to the image impinging the segments B and D. This point corresponds to a maximum X value, exemplified in FIG. 20 as the positive peak of the sinusoidal waveform. As the target moves further to the left, the image moves further to the right and begins impinging the segments B and D. In the formula for calculating the value X, a positive value for B+D is subtracted from A+C resulting in a declining value of X. Eventually, as the target moves leftward to a point where half the image impinges the segments A and C and half the image impinges the segments B and D, which corresponds to the middle zero crossing in FIG. 20. As the target continues moving to the left, the image continues moving to the right, impinging more and more of segments B and D and less and less of segments A and C, resulting in a greater and greater negative value of X. Eventually, the value of X reaches a negative maximum that corresponds to the position of the target where the image no longer impinges the segments A and C and impinges a maximum amount of the segments B and D. As the target moves further and further to the left, less and less image impinges the segments B and D until the target reaches a position where there is no corresponding reflected light impinging any of the segments, which corresponds to the right-most zero crossing in FIG. 20.

Figure 21:
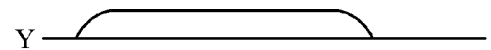
FIG. 21 illustrates an exemplary waveform corresponding to up to down image motion across the segmented sensor while the target motion is from right to left as in FIG. 20.

FIG. 21 illustrates an exemplary waveform corresponding to up to down image motion across the segmented sensor 12 while the target motion is from right to left as in FIG. 20. The exemplary waveforms shown in FIGS. 20 and 21 correspond to target motion purely in the x-direction. Ideally, the Y value for purely x-direction target motion is zero. However, in practice, some non-zero value is typically determined due to the segmented sensor being asymmetrically illuminated by the LED 11. The waveform shown in FIG. 21 shows a positive non-zero value, but is intended to represent some trivial non-zero value, which may be positive, negative, zero, or some combination over time.

Figure 23:
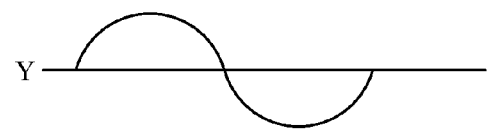
FIG. 23 illustrates an exemplary waveform corresponding to up to down image motion across the segmented sensor of FIG. 3.
Figure 24:
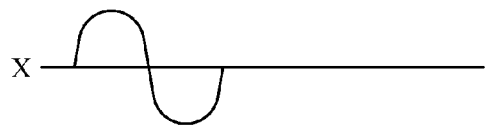
FIGS. 24-27 illustrate waveforms similar to the waveforms of FIGS. 20-23, respectively, except that the target motion corresponding to the waveforms in FIGS. 24-27 is faster than the target motion corresponding to the waveforms in FIGS. 20-23.
Figure 25:
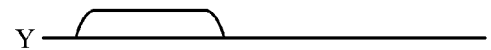
Figure 26:
Figure 27:
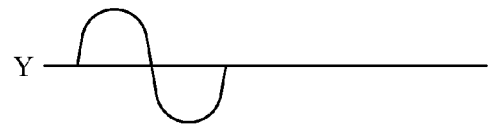

FIG. 23 illustrates an exemplary waveform corresponding to up to down image motion across the segmented sensor 12 of FIG. 3. Up to down image motion correspond to down to up target motion. The waveform shown in FIG. 23 corresponds to the composite signal Y and is determined similarly as the waveform corresponding to the composite signal X shown in FIG. 20. The positive values of Y correspond to reflected light impinging exclusively or predominately in segments A and B, and the negative values of Y correspond to image impinging exclusively or predominately in segments C and D. The zero crossings correspond to either zero image impinging the segments A, B, C, and D, or an equal amount of image impinging segments A+B as impinging segments C+D.

Figure 22:
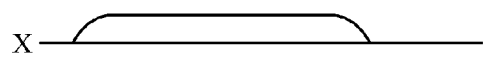
FIG. 22 illustrates an exemplary waveform corresponding to left to right image motion across the segmented sensor while the target motion is from down to up as in FIG. 23.

FIG. 22 illustrates an exemplary waveform corresponding to left to right image motion across the segmented sensor while the target motion is from down to up as in FIG. 23. The exemplary waveforms shown in FIGS. 22 and 23 correspond to target motion purely in the y-direction. Ideally, the X value for purely y-direction target motion is zero. However, in practice, some non-zero value is typically determined due to the segmented sensor being asymmetrically illuminated by the LED 11. The waveform shown in FIG. 22 shows a positive non-zero value, but is intended to represent some trivial non-zero value, which may be positive, negative, zero, or some combination over time.

To determine a gesture in the z-direction, we must look for a sufficient increase in the Z, or VSUM, signal (A+B+C+D) without there being a vector detected in either the x or y direction.

Referring to FIGS. 20 and 23, the positive and negative zero-crossings coincide with the image moving from one side of the segmented sensor to the other. Therefore, the faster the target moves, the faster the image crosses from one side of the segmented sensor to the other, and thereby causes the waveform's zero-crossings to be spaced closer in time. This correlates exactly to velocity. FIGS. 24-27 illustrate waveforms similar to the waveforms of FIGS. 20-23, respectively, except that the target motion corresponding to the waveforms in FIGS. 24-27 is faster than the target motion corresponding to the waveforms in FIGS. 20-23. The waveforms in FIGS. 24-27 have a relationship analogous to the waveforms in FIGS. 20-23, respectively. The waveforms corresponding to faster target motion, such as the waveforms shown in FIGS. 24-27, have a shorter period, or are compressed, compared to waveforms corresponding to similar yet slower target motion, such as the waveforms shown in FIGS. 20-23.

The reflected light is sampled at a predetermined rate, for example once a millisecond. At time zero the X value starts going positive, as shown in FIG. 20. At a later time, such as time equals 30 milliseconds, the X value crosses zero and becomes negative. Divide the sampling rate by the time between zero crossings and the result is a value proportional to the velocity. This is a crude estimate of target velocity as there are other contributing factors, such as distance of the target from the sensor, but this estimate provides an accurate relative velocity compared to the other direction, for example a relative velocity in the x-direction compared to the y-direction since the estimated velocity in both the x and y directions can be calculated using the respective zero crossings and then subsequently compared to each other. An exemplary application is to use the estimated velocity determination as a course-level command, where different commands are determined based on a different estimated velocity. For example, a displayed objected can be commanded to rotate at a fast rate if the determined estimated velocity is greater than a high threshold value, a medium rate if the determined estimated velocity is between the high threshold value and a low threshold value, or a slow rate if the determined estimated velocity is lower than the low threshold value.

The above are examples of waveforms resulting from gestures, or target motion, either purely in the x or y directions. However, many gestures may contain components of both directions, such as a diagonal target motion, and gesture waveform amplitudes may vary from case to case. Therefore, it is reasonable to look for the relative change between positive and negative, specifically zero-crossings, and to do so for both the left-right and up-down channels simultaneously. In the case where target motion is not purely left-right or up-down, the resulting X and Y signal waveforms may vary in both amplitude and period.

Using the information obtained in the composite signal X and the composite signal Y, a two-dimensional vector can be determined. If it is specified that a zero crossing must be followed by a zero crossing in the opposite direction to identify a gesture on either the left-right or up-down channels, and the first zero crossing occurs at time t1 and the second zero crossing occurs at time t2, then the velocity along either the x or y direction is proportional to $1/(t2-t1)$. The direction is determined by whether or not the first zero crossing is negative or positive. Doing this for both the left-right and up-down channels allows the x-direction velocity Vx and the y-direction velocity Vy to be superimposed into a two-dimensional vector in the form $Vxi+Vyj$ using Cartesian coordinates. The Cartesian coordinates are readily converted to polar coordinates including a vector angle. The result is that target motion can be detected along any angle and any velocity in the x,y plane, limited only by the sampling rate. The greater the sampling rate, the finer the resolution of the vector angle. For example, in the case where the determined velocity Vx is greater than velocity Vy, it can be determined that the target is moving more in a left-right direction than an up-down direction.

In some embodiments, various angle thresholds can be defined, and the vector angle is compared to the angle thresholds. For example, a vector angle between +45 degrees and +135 degrees is determined to be an up target motion, and a vector angle between +45 degrees and −45 degrees is determined to be a right target motion. The algorithm can also be asymmetrically weighted. For example, a vector angle of 60 degrees may still be determined as a right target motion although the vector points more toward 90 degrees corresponding to the up target motion. Such an example illustrates the general concept that the algorithm can be programmed to take into account prior gesture distributions, which can be uniform or non-uniform.

Figure 28:
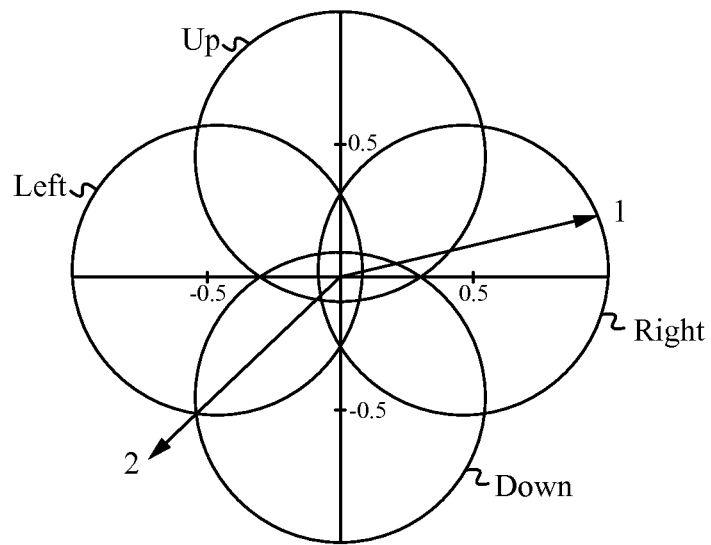
FIG. 28 illustrates four Gaussian distributions corresponding to recognized directions left, right, up, and down.

This concept can be extended by using vectors with a set of probabilistic likelihood functions to plot the confidence that a target motion is in a particular, defined direction. In this manner, the user does not have to make as precise a gesture for the gesture to be recognized as one of the defined target motion directions, such as left, right, up, and down. This can also compensate for certain noise that may have been introduced. For example, if the user wants to recognize only left to right, up to down, right to left, and down to up directions, four likelihood functions can be defined, such as Gaussian distributions, with maxima centered at each desired vector, and half-maximum exactly halfway (radially) between the neighboring desired vectors. FIG. 28 illustrates four Gaussian distributions corresponding to recognized directions left, right, up, and down. In this example, the maxima occur at 0 degrees (right), +90 degrees (up), −90 degrees (down), and 180 degrees (left), with the half-maxima occurring at ±45 and ±135 degrees. In this example, each direction is equally likely to occur. Given some vector, the vector angle with respect to 0 degrees (positive x-direction) is determined, and the likelihood of the vector corresponding to all four likelihood distributions is calculated. The largest of these values is thereby the "most likely" and is decided to be the target motion. Two example vectors are shown in FIG. 28, each vector corresponding to a measured target motion. Vector 1 is determined to be a left to right motion having a 90% confidence. Vector 2 is determined to be ambiguously up to down and right to left because the vector is equally likely to be in the left circle and the down circle. In some embodiments, the algorithm is programmed to provide a predefined result in the case of each such ambiguity. In other embodiments, the algorithm is programmed to not respond to an ambiguous result or to generate an error message or indicator.

Figure 29:
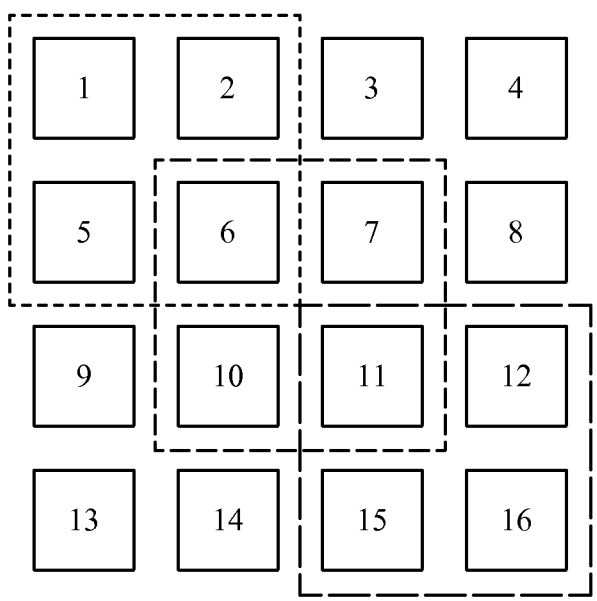
FIG. 29 illustrates an exemplary 4×4 array of photodiode segments.

As described above, the algorithm is applied to a four segment sensor. The segmented sensor and the algorithm are adaptable for use with a sensor have more than four segments, for example an N×N or N×M array of segments. FIG. 29 illustrates an exemplary 4×4 array of photodiode segments. A vector can be determined for each of nine different four-segment arrangements. For example, a first four-segment arrangement includes segments 1, 2, 5, and 6, a second four-segment arrangement includes segments 6, 7, 10, and 11, a third four-segment arrangement includes segments 11, 12, 15, and 16, and so on. By applying the algorithm for each of the nine, four-segment arrangements, a vector field can be assembled that can be used to gain more complex target motion information.

Figure 1:
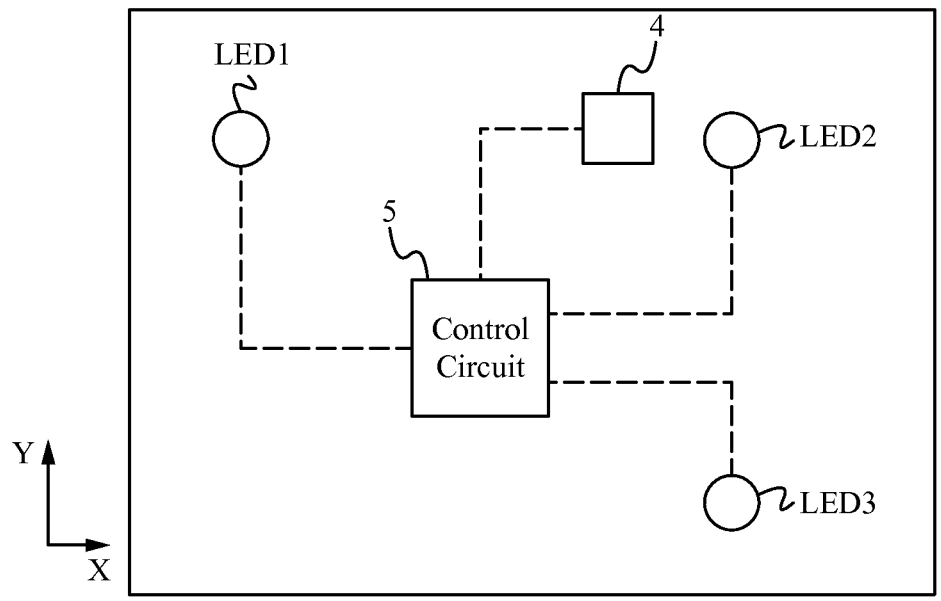
FIG. 1 illustrates a simplified block diagram of a conventional gesture sensor.
Figure 2:
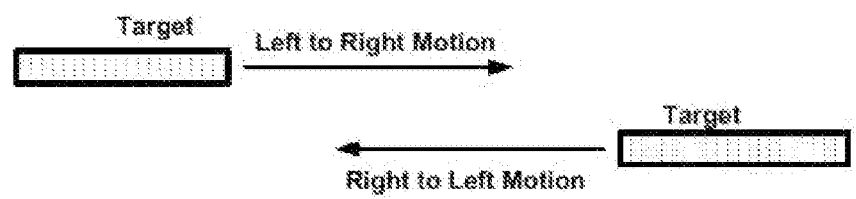
FIG. 2 illustrates an exemplary method for detecting a moving target using the gesture sensor of FIG. 1.
Figure 2:
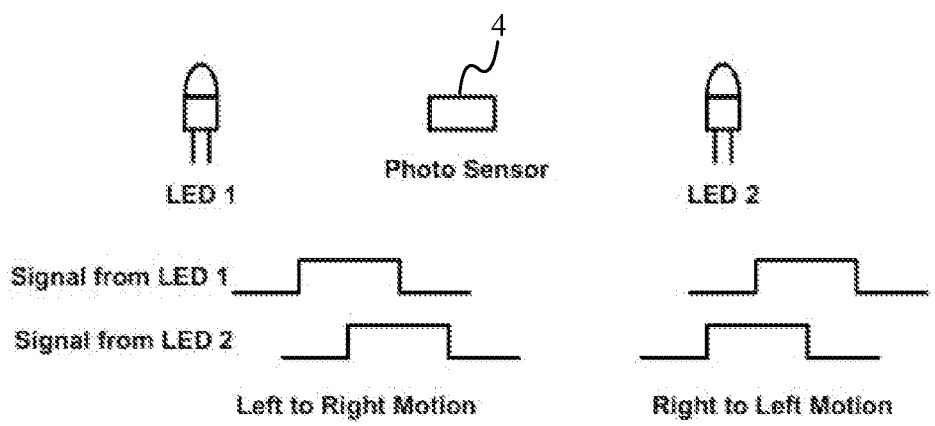

The gesture sensing device is described as using a single illumination source, such as LED 11 is FIG. 3. However, in some embodiments, the single illumination source is intended to represent one or more illumination sources that are concurrently pulsed, as opposed to multiple illumination sources that are serially pulsed as in the conventional device of FIG. 1. By using multiple illumination sources that are pulsed at the same time, a wider coverage area can be achieved. The coverage area of a given illumination source is defined as that area above the illumination source where light reflecting off a target that is within the coverage area will impinge the sensor. The coverage area coincides with the field of view of the segmented sensor. Although light from the illumination source may impinge the target at areas outside the coverage area, it is only while the target is within the coverage area will the reflected light be angled to impinge the segmented sensor. Outside the coverage area, reflected light is not angled properly to impinge the segmented sensor. More than one illumination source, pulsed concurrently, functions to increase the coverage area.

More than one illumination source can also be used with the segmented sensor where the illumination sources are not pulsed concurrently. In this manner, multiple x-channels and multiple y-channels can be implemented, a first x-channel and a first y-channel corresponding to a first illumination source, and so on.

The gesture sensing device and algorithm can also be adapted for use with no illumination source. Instead of detecting the image corresponding to reflected light originating from an illumination source, the ambient light is detected and a decrease in the ambient light resulting from a passing target is determined. In this manner, a passing target casts a shadow over the segmented sensor, where the shadow is measured as a decrease in ambient light. The shadow in an ambient light configuration is inversely analogous to an image in an illumination source configuration. In the ambient light configuration, a polarity of the three composite signals X, Y, and Z is reversed.

The gesture sensing device and algorithm can also be used as a finger tracking application. By analyzing the instantaneous values of the composite signals X and Y, a current location of the target, such as a finger, can be determined. For example, if the value of the composite signal X is positive, or some value greater than some predetermined X positive threshold value, and the value of the composite signal Y is zero, or some near zero value that does not exceed some Y near zero threshold value, then it is determined that a user's finger is positioned to the left of the segmented sensor. Similarly, if the value of the composite signal X is zero, or some near zero value that does not exceed some X near zero threshold value, and the value of the composite signal Y is negative, or some value greater than some predefined Y negative threshold value, then it is determined that the user's finger is positioned below the sensor. If the value of the composite signal X is positive and the value of the composite signal Y is negative, then the user's finger is determined to be positioned near the bottom left corner of the sensor. In this manner, 9 positions can be determined. Eight of the positions are around the perimeter, which are the four corners, left, right, up, and down. The ninth position is the center of the segmented sensor, which corresponds to when the value of the composite signal X and the value of the composite signal Y are both zero, but the Z, or VSUM, signal (A+B+C+D) is not zero. Tracking successive finger positions also determines a vector. For example, three successive finger positions that correspond to left of sensor, center of sensor, and right of sensor, indicates a right to left target motion. In this manner, finger tracking that leads to a vector determination is a more complex method of determining a target motion vector. Finger tracking can also be used for simpler applications, such as a single finger position, instead a sequence of successive finger positions, that indicates a command.

The present application has been described in terms of specific embodiments incorporating details to facilitate the understanding of the principles of construction and operation of the gesture sensing device and method for detecting gestures. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed:

1. A method of detecting a gesture, the method comprising:
    selectively blocking a portion of light reflected from an object from impinging on a light sensor assembly depending upon a position of the object relative to the light sensor assembly using a light modifying wall structure disposed adjacent to the light sensor assembly, the light modifying wall structure comprising a plurality of layers and a plurality of vias, respective ones of the plurality of layers and the plurality of vias offset in a stair-step fashion with respect to a center axis defined perpendicular to a surface of the light sensor assembly;
    calculating one or more differential signals according to time dependent signals output from the light sensor assembly, the light sensor assembly comprising a plurality of light sensors configured to detect light reflected from the object and to output the time dependent signals in response thereto; and
    determining an object motion direction of the object passing over the light sensor assembly by applying vector analysis to the one or more differential signals.

2. The method of claim 1 further comprising determining a proportional value of an object motion velocity of the target passing the segmented sensor by applying vector analysis to the one or more differential signals.

3. The method of claim 1 wherein the light sensed by the light sensor assembly comprises light originated from an illumination source and reflected off the object.

4. The method of claim 1 wherein the light sensed by the light sensor assembly comprises ambient light.

5. The method of claim 1 wherein the one or more differential signals comprise one or more differential composite signals, wherein a composite signal is a signal formed from the addition of two or more time dependent signals.

6. The method of claim 1 wherein calculating one or more differential signals comprises calculating a first differential signal indicating the object motion direction along an x-axis.

7. The method of claim 6 wherein the first differential signal includes a positive maximum value and a negative maximum value, further wherein the object motion direction is determined to be in a positive x-direction if the positive maximum value precedes the negative maximum value in time.

8. The method of claim 6 wherein the first differential signal includes a positive maximum value and a negative maximum value, further wherein the object motion direction is determined to be in a negative x-direction if the negative maximum value precedes the positive maximum value in time.

9. The method of claim 6 wherein calculating one or more differential signals comprises calculating a second differential signal indicating the object motion direction along a y-axis.

10. The method of claim 9 wherein the second differential signal includes a positive maximum value and a negative maximum value, further wherein the object motion direction is determined to be in a positive y-direction if the positive maximum value precedes the negative maximum value in time.

11. The method of claim 9 wherein the second differential signal includes a positive maximum value and a negative maximum value, further wherein the object motion direction is determined to be in a negative y-direction if the negative maximum value precedes the positive maximum value in time.

12. The method of claim 9 further comprising calculating a proportional value of an object motion velocity along the x-axis using a time difference between successive zero crossings of the first differential signal, and calculating a proportional value of a target motion velocity along the y-axis using a time difference between successive zero crossings of the second differential signal.

13. The method of claim 12 further comprising superimposing the proportional value of the object motion velocity along the x-axis and the proportional value of the object motion velocity along the y-axis to form an object vector.

14. The method of claim 13 further comprising determining one of a predefined set of directions according to the object vector.

15. The method of claim 14 wherein the predefined set of directions comprise a positive x-direction, a negative x-direction, a positive y-direction, and a negative y-direction.

16. The method of claim 14 wherein the object vector has a object vector angle and determining one of the predefined set of directions comprises comparing the object vector angle to a set of defined threshold angles.

17. The method of claim 14 wherein determining one of the predefined set of directions comprises comparing the object vector to a set of predefined distribution patterns, each distribution pattern corresponding to one of the directions in the predefined set of directions.

18. The method of claim 17 wherein comparing the object vector comprises determining a confidence value associated with comparing the object vector to each distribution pattern, and selecting one of the predefined set of directions according to the highest confidence value.

19. An apparatus comprising:
    a light sensor assembly comprising a plurality of light sensors, the plurality of light sensors configured to detect the light reflected from an object and to output time dependent signals in response thereto;
    a light modifying wall structure disposed adjacent to the light sensor assembly, the light modifying wall structure configured to selectively block a portion of the light reflected from the object depending on a position of the object relative to the light sensor assembly, the light modifying wall structure comprising a plurality of layers and a plurality of vias, respective ones of the plurality of layers and the plurality of vias offset in a stair-step fashion with respect to a center axis defined perpendicular to a surface of the light sensor assembly;
    a memory configured to store data representing the time dependent signals; and
    a processor coupled to the memory, the processor configured to execute program instructions to cause the processor to:

calculate one or more differential signals according to the time dependent signals output from the light sensor assembly; and determine an object motion direction of an object passing over the light sensor assembly by applying vector analysis to the one or more differential signals.

20. The apparatus of claim 19 wherein the program instructions are further configured to determine a proportional value of an object motion velocity of the object passing over the light sensor assembly by applying vector analysis to the one or more differential signals.

21. The apparatus of claim 19 wherein the light sensed by the light sensor assembly comprises light originated from an illumination source and reflected off the object.

22. The apparatus of claim 19 wherein the light sensed by the light sensor assembly comprises ambient light.

23. The apparatus of claim 19 wherein the one or more differential signals comprise one or more differential composite signals, wherein a composite signal is a signal formed from the addition of two or more time dependent signals.

24. The apparatus of claim 19 wherein calculating one or more differential signals comprises calculating a first differential signal indicating the object motion direction along an x-axis.

25. The apparatus of claim 24 wherein the first differential signal includes a positive maximum value and a negative maximum value, further wherein the object motion direction is determined to be in a positive x-direction if the positive maximum value precedes the negative maximum value in time.

26. The apparatus of claim 24 wherein the first differential signal includes a positive maximum value and a negative maximum value, further wherein the object motion direction is determined to be in a negative x-direction if the negative maximum value precedes the positive maximum value in time.

27. The apparatus of claim 24 wherein calculating one or more differential signals comprises calculating a second differential signal indicating the object motion direction along a y-axis.

28. The apparatus of claim 27 wherein the second differential signal includes a positive maximum value and a negative maximum value, further wherein the object motion direction is determined to be in a positive y-direction if the positive maximum value precedes the negative maximum value in time.

29. The apparatus of claim 27 wherein the second differential signal includes a positive maximum value and a negative maximum value, further wherein the object motion direction is determined to be in a negative y-direction if the negative maximum value precedes the positive maximum value in time.

30. The apparatus of claim 27 wherein the program instructions are further configured to calculate a proportional value of an object motion velocity along the x-axis using a time difference between successive zero crossings of the first differential signal, and calculate a proportional value of an object motion velocity along the y-axis using a time difference between successive zero crossings of the second differential signal.

31. The apparatus of claim 30 wherein the program instructions are further configured to superimpose the proportional value of the object motion velocity along the x-axis and the proportional value of the object motion velocity along the y-axis to form a an object vector.

32. The apparatus of claim 31 wherein the program instructions are further configured to determine one of a predefined set of directions according to the object vector.

33. The apparatus of claim 32 wherein the predefined set of directions comprise a positive x-direction, a negative x-direction, a positive y-direction, and a negative y-direction.

34. The apparatus of claim 33 wherein the object vector has an object vector angle and determining one of the predefined set of directions comprises comparing the object vector angle to a set of defined threshold angles.

35. The apparatus of claim 32 wherein determining one of the predefined set of directions comprises comparing the object vector to a set of predefined distribution patterns, each distribution pattern corresponding to one of the directions in the predefined set of directions.

36. The apparatus of claim 35 wherein comparing the object vector comprises determining a confidence value associated with comparing the object vector to each distribution pattern, and selecting one of the predefined set of directions according to the highest confidence value.

* * * * *